US009902392B2

(12) United States Patent
Ogawa

(10) Patent No.: US 9,902,392 B2
(45) Date of Patent: Feb. 27, 2018

(54) MOBILITY INFORMATION PROCESSING APPARATUS, MOBILITY INFORMATION PROCESSING METHOD, AND DRIVING SUPPORT SYSTEM

(71) Applicant: TOYOTA JIDOSHA KABUSHIKI KAISHA, Toyota-shi, Aichi-ken (JP)

(72) Inventor: Yuki Ogawa, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 132 days.

(21) Appl. No.: 14/908,946

(22) PCT Filed: Jul. 28, 2014

(86) PCT No.: PCT/IB2014/001394
§ 371 (c)(1),
(2) Date: Jan. 29, 2016

(87) PCT Pub. No.: WO2015/019142
PCT Pub. Date: Feb. 12, 2015

(65) Prior Publication Data
US 2016/0185339 A1 Jun. 30, 2016

(30) Foreign Application Priority Data
Aug. 5, 2013 (JP) ................. 2013-162516

(51) Int. Cl.
*B60L 9/00* (2006.01)
*B60W 20/12* (2016.01)
(Continued)

(52) U.S. Cl.
CPC ............ *B60W 20/12* (2016.01); *B60W 10/06* (2013.01); *B60W 10/08* (2013.01); *B60W 10/26* (2013.01);
(Continued)

(58) Field of Classification Search
CPC .. B60W 50/0097; B60W 10/06; B60W 10/08; B60W 10/26; B60W 30/182;
(Continued)

(56) References Cited

U.S. PATENT DOCUMENTS 6,314,347 B1 11/2001 Kuroda et al.
8,170,737 B2 * 5/2012 Tate, Jr. ............... B60W 10/06
701/105
(Continued)

FOREIGN PATENT DOCUMENTS

| JP | 2000-333305 A | 11/2000 |
|---|---|---|
| JP | 2008-107155 A | 5/2008 |
| JP | 2009-012605 A | 1/2009 |
| JP | 2010-213405 A | 9/2010 |
| JP | 2014-151760 A | 8/2014 |
| WO | 2011/126430 A1 | 10/2011 |
| WO | 2013/132593 A1 | 9/2013 |

*Primary Examiner* — Hussein A. Elchanti
(74) *Attorney, Agent, or Firm* — Oliff PLC

(57) ABSTRACT

A mobility information processing apparatus includes: an allocator that allocates one driving mode-selected from driving modes having different drive forms to each partitioned section, in a route of a moving object; and an estimator that estimates the driving mode selected for each section located apart from a predetermined point in the route and that calculates an estimated amount of energy required for traveling in the section estimated to correspond to the one selected driving mode among the driving modes, wherein the allocator determines whether the one selected driving mode is allocated to each section up to a predetermined point in the route on the basis of an allocated energy amount obtained by subtracting the estimated energy amount calculated by the estimator from a residual energy amount of a power source used in the one selected driving mode for each section up to the predetermined point in the route.

11 Claims, 19 Drawing Sheets

(51) Int. Cl.
*B60W 50/00* (2006.01)
*B60W 10/06* (2006.01)
*B60W 10/08* (2006.01)
*B60W 10/26* (2006.01)
*B60W 30/182* (2012.01)
*B60W 20/40* (2016.01)

(52) U.S. Cl.
CPC .......... *B60W 20/40* (2013.01); *B60W 30/182* (2013.01); *B60W 50/0097* (2013.01); *B60W 2510/244* (2013.01); *B60W 2530/16* (2013.01); *B60W 2550/141* (2013.01); *B60W 2550/143* (2013.01); *B60W 2550/402* (2013.01); *B60W 2710/244* (2013.01); *Y02T 10/6291* (2013.01)

(58) Field of Classification Search
CPC .. B60W 2530/16; B60W 20/40; B60W 20/12; B60W 2510/244; B60W 2550/141; B60W 2550/143; B60W 2550/402; B60W 2710/244; Y02T 10/6291
See application file for complete search history.

(56) References Cited

U.S. PATENT DOCUMENTS

| | | | |
|---|---|---|---|
| 8,606,513 B2* | 12/2013 | Chen | B60L 3/12 701/22 |
| 9,346,466 B2* | 5/2016 | Papajewski | B60W 50/00 |
| 2002/0107618 A1* | 8/2002 | Deguchi | B60W 20/12 701/22 |
| 2009/0259363 A1* | 10/2009 | Li | B60K 6/445 701/36 |
| 2011/0022255 A1* | 1/2011 | Yamada | B60K 6/46 701/22 |
| 2011/0160946 A1 | 6/2011 | Wilde et al. | |
| 2012/0010767 A1* | 1/2012 | Phillips | G01C 21/3469 701/22 |
| 2012/0035795 A1* | 2/2012 | Yu | B60W 50/0097 701/22 |
| 2013/0002188 A1* | 1/2013 | Uyeki | H01M 10/44 320/101 |
| 2015/0066270 A1 | 3/2015 | Ogawa | |

* cited by examiner

MOBILITY INFORMATION PROCESSING APPARATUS, MOBILITY INFORMATION PROCESSING METHOD, AND DRIVING SUPPORT SYSTEM

BACKGROUND OF THE INVENTION

1. Field of the Invention

The present invention relates to a mobility information processing apparatus, a mobility information processing method, and a driving support system having a mobility information processing function.

2. Description of Related Art

As a vehicle including plural driving modes, a hybrid vehicle using an engine and motor together as a drive source is known. The hybrid vehicle includes a mode (HV mode) in which the engine and the motor are simultaneously used and a mode (EV mode) in which the vehicle travels using only the motor with the engine stopped as the plural driving modes. A mobility information processing apparatus including a navigation system mounted on the hybrid vehicle calculates a travel route from a current location to a destination and selects a driving mode to be applied to each partitioned section in the travel route, on the basis of map information, road traffic information, or the like. For example, Japanese Unexamined Patent Application Publication No. 2009-12605 describes an example of a controller of a vehicle having such a mobility information processing function.

The controller of a vehicle described in Japanese Unexamined Patent Application Publication No. 2009-12605 is provided to a vehicle having plural driving modes and includes means for detecting travel information of the vehicle influenced by preference of a driver, storage means for storing the travel information for each category classified on the basis of at least road information, and means for updating and storing the detected travel information in the storage means. The controller further includes means for searching for a travel route to a destination, means for specifying road information in the searched travel route, means for specifying a category corresponding to the searched travel route on the basis of the specified road information, and means for reading travel information in the specified category from the storage means. The controller further includes prediction means for predicting an energy balance in the searched travel route on the basis of the read travel information, setting means for setting a driving mode in the searched travel route on the basis of the predicted energy balance, and means for controlling the vehicle so as to travel in the set travel mode.

In order to set the driving mode for the travel route like the controller of the vehicle described in Japanese Unexamined Patent Application Publication No. 2009-12605, it is necessary to manage an energy balance, for example, a travel load, for each section of all the sections of the travel route. However, the number of sections included in the travel route greatly varies depending on the distance to a destination, road environments in the travel route, compactness of the partitioned sections, and the like. Accordingly, when the number of sections included in the travel route is greater than the number of sections that can be processed by the controller, it is difficult to allocate appropriate driving modes to all the sections of the travel route.

This problem is mainly common to apparatuses or methods of allocating driving modes for a moving object including plural driving modes having different energy balances.

SUMMARY OF THE INVENTION

The present invention provides a mobility information processing apparatus, a mobility information processing method, and a driving support system having a mobility information processing function that can allocate appropriate driving modes to sections even when the number of sections in a travel route is greater than the number of sections in control of a moving object including plural driving modes.

According to a first aspect of the present invention, there is provided a mobility information processing apparatus including: an allocation unit that allocates one driving mode, which is selected from a plurality of driving modes having different drive forms, as the driving mode of a moving object to each partitioned section in a travel route of the moving object; and an estimation unit that estimates the driving mode selected for each section located apart from a predetermined point in the travel route and that calculates an estimated amount of energy required for traveling in the section estimated to correspond to the one selected driving mode among the plurality of driving modes, wherein the allocation unit determines whether the one selected driving mode is allocated to each section up to a predetermined point in the travel route on the basis of an allocated amount of energy obtained by subtracting the estimated amount of energy calculated by the estimation unit from a residual amount of energy of a power source used in the one selected driving mode for each section up to the predetermined point in the travel route.

According to a second aspect of the present invention, there is provided a mobility information processing method of allocating one driving mode, which is selected from a plurality of driving modes having different drive forms, as the driving mode of a moving object to each partitioned section in a travel route of the moving object, including: estimating the driving mode selected for each section located apart from a predetermined point in the travel route and calculating an estimated amount of energy required for traveling in the section estimated to correspond to the one selected driving mode among the plurality of driving modes; and determining whether the one selected driving mode is allocated to each section up to a predetermined point in the travel route on the basis of an allocated amount of energy obtained by subtracting the calculated estimated amount of energy from a residual amount of energy of a power source used in the one selected driving mode for each section up to the predetermined point in the travel route.

In the aspects, the predetermined point in the travel route may be a point determined as the upper limit value of the number of sections in the travel route to which the driving modes are able to be allocated by the allocation unit.

In the aspects, the moving object may be a hybrid vehicle, and the plurality of driving modes may include a mode in which the hybrid vehicle travels by the use of an electric motor using a battery as a power source as the one selected driving mode and may include a second driving mode which is a driving mode in which the hybrid vehicle travels by the use of the electric motor and an internal combustion engine together when the one selected driving mode is a first driving mode.

In the aspects, a travel load used to calculate an energy balance required for traveling in each section of the travel route may be set for each section, and the allocation unit may allocate the first driving mode to the sections having a relatively low travel load among the sections up to the predetermined point in the travel route and may allocate the second driving mode to the other sections.

In the aspects, the allocation unit may allocate the first driving mode to the sections in the travel route in the ascending order of the travel load.

In the aspects, the estimation unit may estimate sections to which the first driving mode is allocated on the basis of the travel load.

In the aspects, the estimation unit may merge the sections estimated to correspond to the one selected driving mode into one section and may, calculate the estimated amount of energy of the merged section, and the allocation unit may calculate the allocated amount of energy by subtracting the estimated amount of energy of the merged section from the residual amount of energy of a power source used in the one selected driving mode for each section up to the predetermined point in the travel route.

In the aspects, the estimation unit may further estimate the amount of energy required for all the sections of the travel route, and the allocation unit may allocate the one selected driving mode to all the sections of the travel route when the residual amount of energy of the power source used in the one selected driving mode is greater than the estimated amount of energy required for all the sections of the travel route in the sections up to the predetermined point in the travel route before determining whether the one selected driving mode is allocated to the sections up to the predetermined point in the travel route.

In the aspects, the allocation unit may be disposed in the moving object.

According to a third aspect of the present invention, there is provided a mobility information processing apparatus including: an allocation unit that allocates one driving mode, which is selected from a plurality of driving modes having different drive forms, as the driving mode of a moving object to each partitioned section in a travel route of the moving object and that allocates one driving mode, which is selected from the plurality of driving modes on the basis of an attribute condition determined depending on a section attribute of each section up to a predetermined point in the travel route, as the driving mode of the sections up to the predetermined point in the travel route when an amount of energy required for traveling in the sections located apart from the predetermined point in the travel route is not able to be estimated.

According to a fourth aspect of the present invention, there is provided a mobility information processing method of allocating one driving mode, which is selected from a plurality of driving modes having different drive forms, as the driving mode of a moving object to each partitioned section in a travel route of the moving object, including: allocating one driving mode, which is selected from the plurality of driving modes on the basis of an attribute condition determined depending on a section attribute of each section up to a predetermined point in the travel route, as the driving mode of the sections up to the predetermined point in the travel route when an amount of energy required for traveling in the sections located apart from the predetermined point in the travel route is not able to be estimated.

In the aspects, the predetermined point in the travel route may be a point determined as the upper limit value of the number of sections in the travel route to which the driving modes are able to be allocated.

In the aspects, the moving object may be a hybrid vehicle, the plurality of driving modes may include a mode in which the hybrid vehicle travels by the use of an electric, motor using a battery as a power source as the one selected driving mode and may include a second driving mode which is a driving mode in which the hybrid vehicle travels by the use of the electric motor and an internal combustion engine together when the one selected driving mode is a first driving mode, and the attribute condition determined depending on the section attribute may be a condition determined depending on a type of a road on which the hybrid vehicle travels.

In the aspects, the attribute condition determined depending on the section attribute may be a condition determined depending on a type of a road on which the hybrid vehicle travels.

In the aspects, the type of a road may include a roadway and an expressway, and the allocation unit may allocate the first driving mode to the roadway and may allocate the second driving mode to the expressway.

According to a fifth aspect of the present invention, there is provided a driving support system that supports a driving operation of causing a moving object to travel on the basis of one driving mode, which is selected from a plurality of driving modes having different drive forms and allocated to partitioned sections in a travel route of the moving object, including: an allocation unit that allocates one driving mode, which is selected from a plurality of driving modes having different drive forms, as the driving mode of a moving object to each partitioned section in a travel route of the moving object; and an estimation unit that estimates the driving mode selected for each section located apart from a predetermined point in the travel route and that calculates an estimated amount of energy required for traveling in the section estimated to correspond to the one selected driving mode among the plurality of driving modes, wherein the allocation unit determines whether the one selected driving mode is allocated to each section up to a predetermined point in the travel route on the basis of an allocated amount of energy obtained by subtracting the estimated amount of energy calculated by the estimation unit from a residual amount of energy of a power source used in the one selected driving mode for each section up to the predetermined point in the travel route, and one driving mode selected from the plurality of driving modes is allocated to each section in the travel route.

According to a sixth aspect of the present invention, there is provided a driving support system that supports a driving operation of causing a moving object to travel on the basis of one driving mode, which is selected from a plurality of driving modes having different drive forms and allocated to partitioned sections in a travel route of the moving object, including: an allocation unit that allocates one driving mode, which is selected from a plurality of driving modes having different drive forms, as the driving mode of a moving object to each partitioned section in a travel route of the moving object and that allocates one driving mode, which is selected from the plurality of driving modes on the basis of an attribute condition determined depending on a section attribute of each section up to a predetermined point in the travel route, as the driving mode of the sections up to the predetermined point in the travel route when an amount of energy required for traveling in the sections located apart from the predetermined point in the travel route is not able to be estimated, wherein one driving mode selected from the plurality of driving modes is allocated to each section in the travel route.

According to the aspects, it is possible to allocate appropriate driving modes to sections even when the number of sections in a travel route is greater than the number of sections in control of a moving object including plural driving modes.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

First Embodiment

Hereinafter, a first embodiment of a mobility information processing apparatus, a mobility information processing method, and a driving support system will be described with reference to FIGS. 1 to 8. The mobility information processing apparatus, the mobility information processing method, and the driving support system according to this embodiment are applied, for example, to a hybrid automobile as a hybrid vehicle having an electric motor using a battery as a power source and an engine (internal combustion engine) using fuel as a power source as drive sources.

Figure 1:
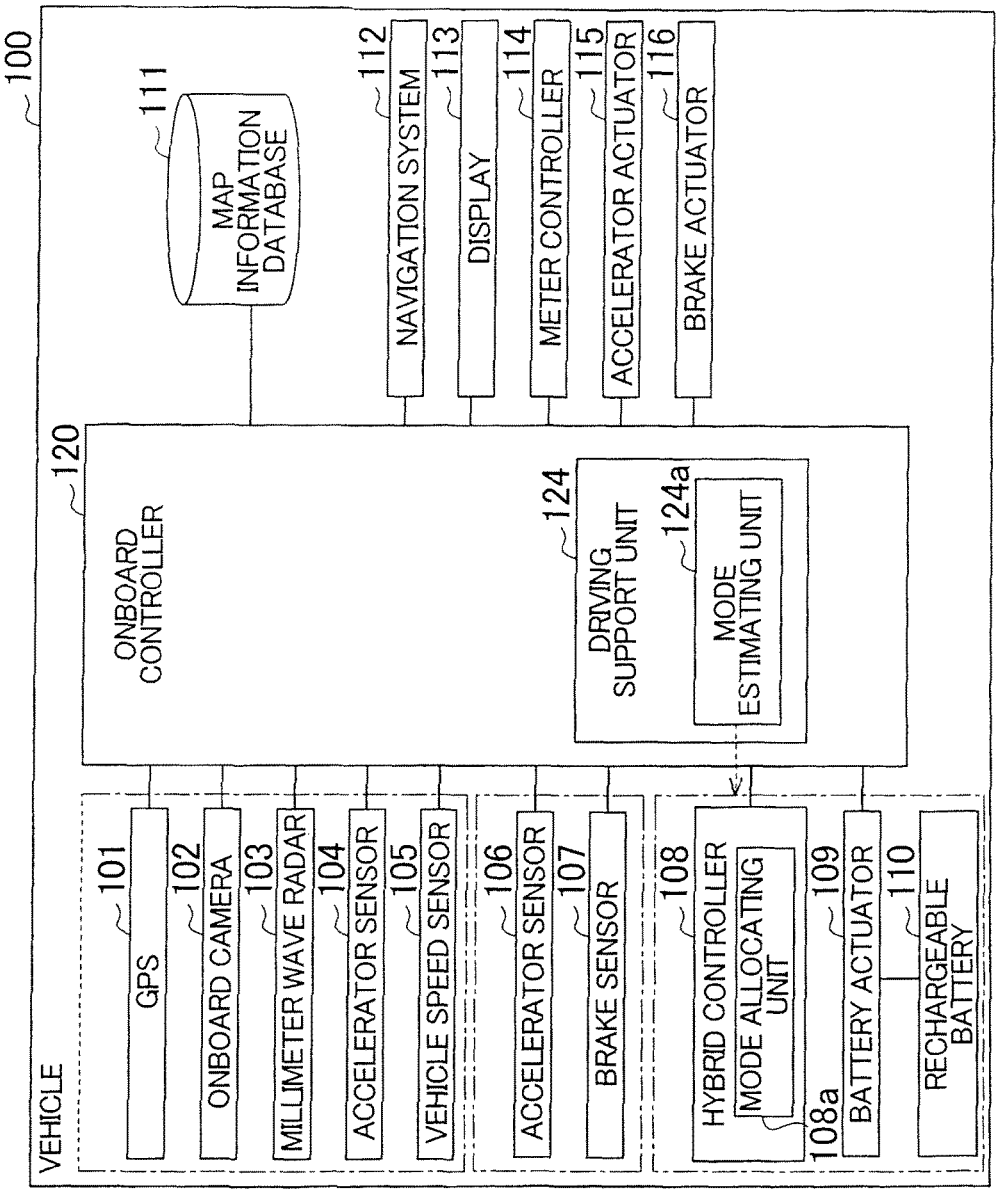
FIG. 1 is a block diagram schematically illustrating a configuration of a first embodiment of a mobility information processing apparatus.

As illustrated in FIG. 1, for example, a vehicle 100 according to this embodiment is provided with a GPS unit 101, an onboard camera 102, a millimeter wave radar 103, an acceleration sensor 104, and a vehicle speed sensor 105 as units for detecting a travel state of the vehicle 100. The GPS unit 101, the onboard camera 102, the millimeter wave radar 103, the acceleration sensor 104, and the vehicle speed sensor 105 are connected to an onboard controller 120 that performs various vehicle controls via an onboard network such as a controller area network (CAN). The onboard controller 120 is a so-called electronic control unit (ECU) and includes a microcomputer having a computing unit or a storage unit. The onboard controller 120 can perform various controls by computing programs or parameters stored in the storage unit by the use of the computing unit.

The GPS unit 101 receives signals from GPS satellites and detects the position of the vehicle 100, for example, as latitude and longitude on the basis of the received signals from the GPS satellites. The GPS unit 101 outputs position information which is information indicating the detected position (latitude and longitude) of the vehicle 100 to the onboard controller 120. The onboard camera 102 captures an image of the surrounding of the vehicle 100 and outputs the captured image data to the onboard controller 120. The millimeter wave radar 103 senses an object present around the vehicle 100 using RF waves of millimeter wavelengths and outputs a signal corresponding to the sensing result to the onboard controller 120.

The acceleration sensor 104 detects an acceleration of the vehicle 100 and outputs a signal corresponding to the detected acceleration to the onboard controller 120. The vehicle speed sensor 105 detects a wheel rotation speed of the vehicle 100 and outputs a signal corresponding to the detected rotation speed to the onboard controller 120.

The accelerator sensor 106 detects a degree of operation of an accelerator pedal by a driver and outputs a signal corresponding to the detected degree of operation of the accelerator pedal to the onboard controller 120. The brake sensor 107 detects a degree of operation of a brake pedal by the driver and outputs a signal corresponding to the detected degree of operation of the brake pedal to the onboard controller 120.

The vehicle 100 is also provided with an accelerator actuator 115 that controls the operating state of the engine and a brake actuator 116 that controls the brake. The accelerator actuator 115 and the brake actuator 116 are electrically connected to the onboard controller 120. The accelerator actuator 115 controls the engine on the basis of a control quantity of the engine that is calculated by the onboard controller 120 on the basis of the detected value of the accelerator sensor 106. The brake actuator 116 controls the brake on the basis of a control quantity of the brake that is calculated by the onboard controller 120 on the basis of the detected value of the brake sensor 107.

The vehicle 100 is also provided with a rechargeable battery 110 as a battery which is a power source of the electric motor as a drive source and a battery actuator 109 that controls charging and discharging of the rechargeable battery 110. The battery actuator 109 is electrically connected to the onboard controller 120. The battery actuator 109 manages charging and discharging of the rechargeable battery 110. The batter actuator 109 drives the electric motor by controlling the discharging of the rechargeable battery 110 or charges the rechargeable battery 110 by regeneration of the electric motor.

The vehicle 100 is also provided with a hybrid controller 108 that controls the operating states of the engine and the electric motor. The hybrid controller 108 is electrically connected to the onboard controller 120. That is, the hybrid controller 108 is electrically connected to the battery actuator 109, the accelerator actuator 115, and the brake actuator 116 via the onboard controller 120. The hybrid controller 108 is a so-called ECU and includes a microcomputer including a computing unit or a storage unit. The hybrid controller 108 can perform various controls by computing programs or parameters stored in the storage unit by the use of the computing unit.

The hybrid controller 108 determines distribution (output ratio) of a drive force of the engine and the electric motor, for example, on the basis of the detection results of the acceleration sensor 104, the vehicle speed sensor 105, and the accelerator sensor 106 input from the onboard controller 120. In this embodiment, particularly, the hybrid controller 108 adjusts battery residual capacity which is a residual amount of energy of the rechargeable battery 110 by changing the distribution (output ratio) of the drive force of the engine and the electric motor.

The hybrid controller 108 generates a control command of the battery actuator 109 relevant to discharging of the rechargeable battery 110 or information on a control quantity of the engine calculated by the onboard controller 120 on the basis of the distribution of the drive force. The hybrid controller 108 determines distribution of a braking force of the brake and the electric motor, for example, on the basis of the detection results of the acceleration sensor 104, the vehicle speed sensor 105, and the brake sensor 107 input from the onboard controller 120. The hybrid controller 108 generates a control command of the battery actuator 109 relevant to charging of the rechargeable battery 110 or information on a control quantity of the brake calculated by the onboard controller 120 on the basis of the distribution of the braking force. That is, the hybrid controller 108 controls charging and discharging of the rechargeable battery 110 by outputting the generated control commands to the battery actuator 109. Accordingly, the electric motor using the rechargeable battery 110 as a power source (power source) is driven by the discharging of the rechargeable battery 110 or the rechargeable battery 110 is charged by regeneration of the electric motor. The onboard controller 120 can monitor execution states of the hybrid control or a state of charge of the rechargeable battery 110.

In this embodiment, the vehicle 100 includes an EV mode as a first driving mode in which the vehicle 100 travels using the rechargeable battery 110 as a power source and the electric motor as a drive source and an HV mode as the second driving mode in which the vehicle 100 travels using the electric motor and the engine as the drive source together. The hybrid controller 108 performs a control of switching the driving mode to the EV mode and the HV mode, for example, depending on the selection result of the driver of the vehicle 100. The hybrid controller 108 has, for example, a function of automatically switching the driving mode to the EV mode and the HV mode and performs a control of switching the driving mode to the EV mode and the HV mode on the basis of the amount of energy required for traveling in each section of the travel route of the vehicle 100, that is, information on a travel load, input from the onboard controller 120. In this embodiment, the travel load (the amount of energy required for traveling) is an amount of load per unit distance in the section and is an average amount of load required for traveling in the section. On the other hand, the accumulated value of the travel load required for completely traveling in the section is referred to as a complete travel load (an amount of energy required for completely traveling).

In general, the traveling using the electric motor tends to have high efficiency when it is applied to a section having a small travel load, and the traveling using the engine tends to have high efficiency when it is applied to the section having a large travel load. Therefore, the hybrid controller 108 allocates the EV mode to a section having a small travel load and allocates the HV mode to a section having a large travel load. Accordingly, the automatic switching function performs the EV mode, for example, when the travel load of the vehicle 100 is less than or equal to a predetermined load (switching threshold value), and performs the HV mode when the travel load of the vehicle 100 is greater than the predetermined load (switching threshold value).

In this embodiment, the hybrid controller 108 includes a mode allocating unit 108a constituting a mobility information processing apparatus that allocates the EV mode or the HV mode to plural sections of a travel route acquired from the onboard controller 120. The mode allocating unit 108a performs its function by causing the hybrid controller 108 to execute a program or the like. The mode allocating unit 108a has a function of setting one or more sections of a travel route acquired from the onboard controller 120 as a driving mode allocation target and determining whether to allocate the EV mode to the target section depending on the travel load of the target section. The mode allocating unit 108a allocates the EV mode to a section that is determined to "enable" allocation of the EV mode and allocates the HV mode to a section that is determined to "disable" allocation of the EV mode. The hybrid controller 108 automatically switches the driving mode of the vehicle 100 so as to travel in the driving mode allocated to each section of the travel route by the mode allocating unit 108a when traveling in the section.

The mode allocating unit 108a compares the travel loads of plural target sections with each other and allocates the EV mode sequentially to the section having a small travel load. The mode allocating unit 108a adds complete travel loads (an amount of energy required for completely traveling) of the sections to which the EV mode is allocated and subtracts the accumulated complete travel load from the residual amount of energy of the rechargeable battery 110. The mode allocating unit 108a continues to allocate the EV mode to the sections so that the accumulated complete travel load is not greater than the residual amount of energy of the rechargeable battery 110. Accordingly, the mode allocating unit 108a allocates the EV mode to a section having a relatively small travel load among the sections of the travel route. The mode allocating unit 108a allocates the HV mode to a section to which the EV mode is not allocated.

The number of sections to which the driving mode can be allocated at a time by the hybrid controller 108 is limited to the upper limit value Nmax on the basis of the its processing capacity such as the length of the processing time or the like. Therefore, the hybrid controller 108 performs the driving mode allocating process on the sections up to a predetermined point in the travel route at which the number of sections is equal to the upper limit value Nmax. Accordingly, when a destination point is far from the predetermined point, that is, when the number of sections up to the destination point is greater than the upper limit value Nmax, the hybrid controller 108 cannot perform the driving mode allocating process on the sections farther than the predetermined point among the sections of the travel route, that is, the sections exceeding the upper limit value Nmax. In this state, the hybrid controller 108 does not allocate the driving modes to the sections up to the predetermined point in the travel route in consideration of the sections exceeding the upper limit value Nmax. That is, the hybrid controller 108 allocates the driving mode to some sections other than the sections exceeding the upper limit value Nmax as target sections when the total number of sections of the travel route is greater than the upper limit value Nmax. In this way, when the hybrid controller 108 allocates the driving mode to only some sections of the travel route as the target sections, the allocation of the driving mode to the sections may not be appropriately performed on all the sections of the travel route.

The vehicle 100 includes a map information database 111 in which map data is registered. The map data is geography data such as roads. In the map data, data capable of displaying geography and information on positions such as latitude and longitude are registered. In the map data, at least one of crossing name, road name, direction name, and direction guide facility information may be registered.

The map information database 111 includes node data that is information on a node indicating a position on a road and link data which is information on a link as a section between two nodes. The node is set to a position of a specific traffic element such as a crossing, a traffic sign on a road, a curve or a point at which the number of lanes is changed, or the like. The node data includes information of a node and road information at the position. The link is set as a section between two nodes defined by two nodes. The link data includes position information of two nodes and road information of the section of the link. A travel load can be acquired or calculated from travel load information included in the link data. The road information of the section of the link includes information such as a position of a start point, a position of an end point, a distance, a route, and undulation. The link data may include a variety of data such as cost data including the travel load of the section of the link, road data including a road type, mark data indicating a specific position, crossing data indicating information of crossings, and facility data indicating information of facilities.

Specifically, the node data may include a node ID that is an identification number of a node, the coordinate of a node, link IDs of all links connected to a node, and a node type indicating the type such as a crossing or a merging point. The node data may include data indicating characteristics of a node such as an image ID that is the identification number of an image indicating the node.

The link data may include, for example, the link ID that is the identification number of a link, a link length, and the node IDs of the nodes connected to a start point and an endpoint. The link data may include road types such as an expressway, a toll road, a roadway, an urban/suburban road, and a mountain road and necessary information among data indicating a road width, the number of lanes, a link travel time, a legal speed limit, a road gradient, and the like. The link data may include data indicating an average value, a maximum value, and a minimum value of a travel time, a travel speed, an amount of fuel consumption, an amount of power consumption, and the like as travel load information that is a necessary output of the vehicle 100 in each link. The amount of power consumption is an amount of power consumed by the electric motor when the vehicle 100 travels in the EV mode. The travel load of a link (section) is acquired or calculated on the basis of such travel load information. In this embodiment, the travel load is an average value of a link (section) and is expressed in the unit of [kW]. The complete travel load as an accumulated value of the travel loads required for completely traveling in the links (sections) can be calculated from the travel loads and the link lengths (section lengths).

The vehicle 100 is provided with a navigation system 112 that performs route guidance or the like. The navigation system 112 acquires a current point (latitude and longitude) of the vehicle 100 from the onboard controller 120 to which the detection result of the GPS unit 101 is input. When a destination is set by a driver, the navigation system 112 specifies the position (latitude and longitude) of the destination. The navigation system 112 searches for a travel route from the current point of the vehicle 100 to the position of the destination with reference to the map information database 111, for example, using a Dikstra method. The navigation system 112 calculates the travel load, the travel time, the travel speed, the amount of fuel consumption, and the amount of power consumption, for example, in the searched travel route. The navigation system 112 outputs the searched travel route or information indicating the calculated travel load, travel time, travel speed, amount of fuel consumption, and amount of power consumption to the onboard controller 120 and outputs the data or information to a display unit 113 including a liquid crystal display disposed in the vehicle interior via the onboard controller 120.

The vehicle 100 is provided with a meter controller 114 that controls display states of meters displayed on an instrument panel disposed on a dash board. The meter controller 114 acquires, for example, data indicating charging and discharging states of the rechargeable battery 110 from the onboard controller 120 and visually displays, for example, an energy flow in the vehicle 100 on the basis of the acquired data. The energy flow is a flow of energy in the vehicle 100 generated by the charging and discharging of the rechargeable battery 110, the driving/regeneration of the electric motor, and the like. The energy flow may include a flow of energy in the vehicle 100 generated by the driving force of the engine or the like.

The onboard controller 120 in this embodiment includes a driving support unit 124 that supports allocation of the driving mode based on the travel route. The driving support unit 124 acquires information of the travel route to a destination point set by the driver from the navigation system 112. The driving support unit 124 includes a mode estimating unit 124*a* constituting the mobility information processing apparatus that performs estimation of the driving modes allocated to the sections of the acquired travel route or the like. The mode estimating unit 124*a* performs its function by causing the onboard controller 120 to execute a program.

The mode estimating unit 124*a* estimates the driving mode selected for each section located farther than a predetermined point in the travel route and calculates an estimated amount of energy required for traveling in the section estimated to correspond to one driving mode selected from plural driving modes. For example, the mode estimating unit 124a estimates the driving mode allocated to correspond to each section and merges all sections estimated to correspond to the one driving mode selected from the plural driving modes. The mode estimating unit 124a may merge all the sections estimated to correspond to two or more driving modes out of the plural driving modes by the driving modes.

Specifically, the mode estimating unit 124a has an estimation threshold value to be compared with the travel load so as to estimate whether the driving mode of a section is selected to the EV mode. The estimation threshold value may be equal to the estimation threshold value set in the hybrid controller 108. That is, the estimation threshold value has a value corresponding to the amount of energy. The estimation threshold value has the upper limit value Nmax of the hybrid controller 108 and the upper limit value Nmax of the section is used as the predetermined point. The mode estimating unit 124a estimates whether the EV mode is allocated to each section exceeding the upper limit value Nmax by comparing the travel load of the section with the estimation threshold value. That is, the mode estimating unit 124a estimates that the EV mode is allocated to the section on the condition that the travel load of the section is less than or equal to the estimation threshold value. The mode estimating unit 124a merges all the sections estimated to allocate the EV mode thereto into one section and sets low-load area information including the travel load or the section length of all the merged sections for the one merged section. The mode estimating unit 124a estimates the other sections not estimated to allocate the EV mode thereto as sections to which the HV mode is allocated, merges these sections into one section, and sets high-load area information including the travel load or the section length of all the merged section for the one merged section.

The mode estimating unit 124a in this embodiment outputs the sections of the travel route along with the information indicating the travel load (amount of energy) to the hybrid controller 108. That is, the mode estimating unit 124a can reduce the number of sections of the travel route input from the navigation system 112 to be less than or equal to the upper limit value Nmax and can output the number of sections to the hybrid controller 108.

The hybrid controller 108 specifies the section in which the vehicle currently travels by appropriately acquiring information of the current position from the onboard controller 120, and causes the vehicle 100 to travel in the driving mode allocated to the specified section. That is, the hybrid controller 108 switches the driving mode of the vehicle 100 to the EV mode or the HV mode allocated to the section whenever the travel section of the vehicle 100 is changed. Accordingly, the vehicle 100 can travel in the driving mode allocated to the section in which the vehicle currently travels.

When a travel route is input from the onboard controller 120, the hybrid controller 108 allocates the driving mode to each section of the travel route. At this time, when the total number of sections in the travel route input from the driving support unit 124 is greater than the upper limit value Nmax, the hybrid controller 108 does not include the sections exceeding the upper limit value Nmax as the processing target and thus the driving modes may not be appropriately allocated to all the sections of the travel route. However, when the total number of sections in the travel route input from the driving support unit 124 is less than or equal to the upper limit value Nmax, the hybrid controller 108 can allocate the driving modes to all the sections of the travel route. Accordingly, in this embodiment, even when the number of sections of the travel route is greater than the number of sections in control of the hybrid controller 108, that is, even when the number of sections of the travel route is greater than the upper limit value Nmax as the number of sections capable of being subjected to the driving mode allocating process at a time, it is possible to allocate appropriate driving modes to all the sections of the travel route.

A schematic aspect in which the driving support unit 124 merges some sections of the travel route and calculates a travel load (estimated amount of energy) estimated for the merged section will be described below with reference to FIGS. 2 and 3.

Figure 2:
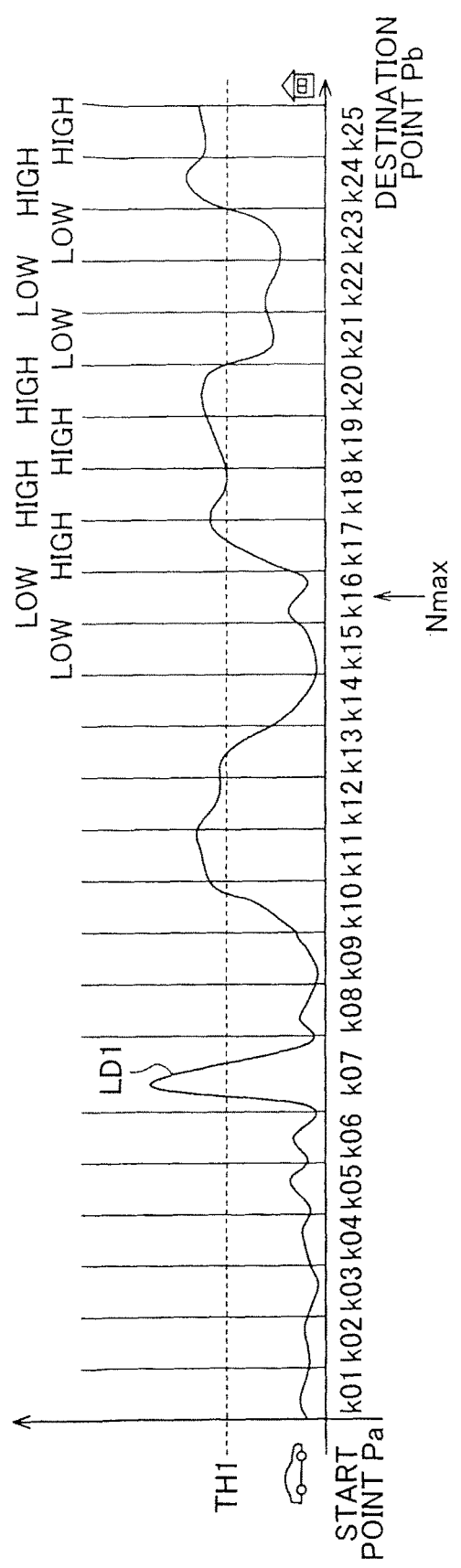
FIG. 2 is a diagram schematically illustrating sections in a travel route that are processed by the mobility information processing apparatus.

As illustrated in FIG. 2, when a travel route is defined to have a start point Pa and a destination point Pb, it is assumed that the travel route searched by the navigation system 112 includes 25 sections of a first section k01 to a twenty-fifth section k25. It is also assumed that each of the first section k01 to the twenty-fifth section k25 includes information on the travel load (amount of energy) for each section. It is assumed that the upper limit value Nmax which is the number of sections capable of being subjected to the driving mode allocating process at a time and processable by the hybrid controller 108 in control is "16". It is assumed that the upper limit value Nmax of the hybrid controller 108 is set to "16" in the driving support unit 124. Graph LD1 in FIGS. 2 and 3 is a graph indicating a variation in the amount of energy, that is, a load variation, required for causing the vehicle 100 to travel in the travel route and the average load variation of each section is the travel load of the corresponding section.

At this time, when the hybrid controller 108 allocates the driving modes to only the sections of the first section k01 to the sixteenth section k16, the driving modes may not be appropriately allocated to the sections of the seventeenth section k17 to the twenty-fifth section k25 exceeding the upper limit value Nmax.

Figure 3:
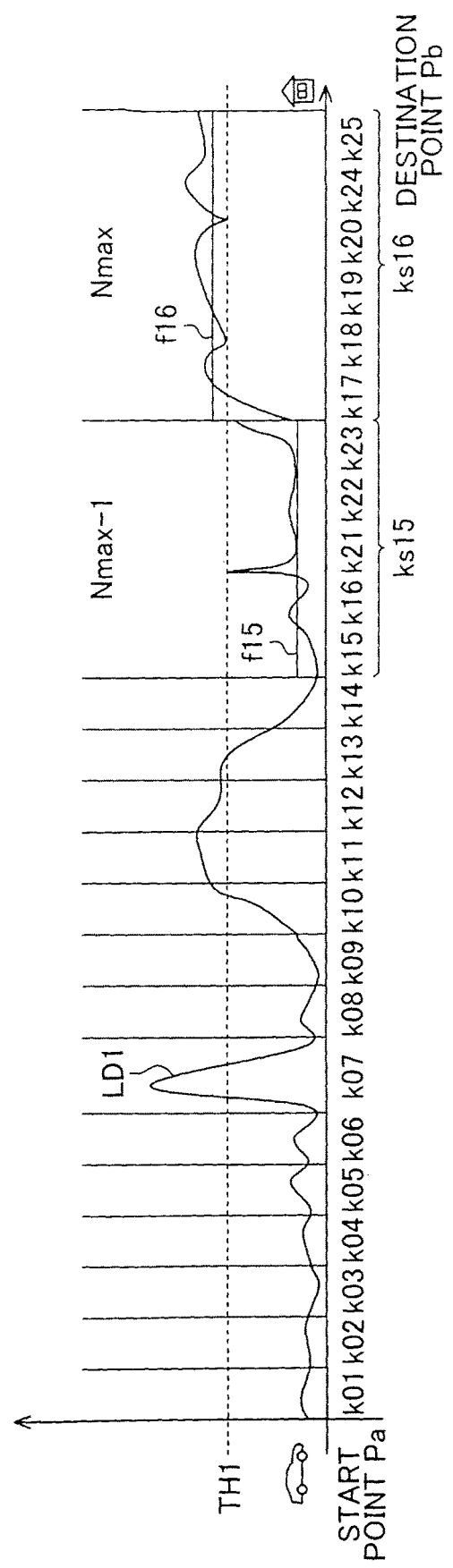
FIG. 3 is a diagram schematically illustrating sections that are merged by the mobility information processing apparatus.

Therefore, as illustrated in FIG. 3, the driving support unit 124 sets the first section k01 to the fourteenth section k14 among the first section k01 to the twenty-fifth section k25 as sections to be processed as it were and sets the fifteenth section k15 to the twenty-fifth section k25 as sections to be merged. The driving support unit 124 merges the sections of which the travel load is less than or equal to the estimation threshold value TH1 among the fifteenth section k15 to the twenty-fifth section k25 into a low-load section ks15, and merges the sections of which the travel load is greater than the estimation threshold value TH1 into a high-load section ks16. For example, the low-load section ks15 is a section into which the fifteenth section k15, the sixteenth section k16, and the twentieth section k20 to the twenty-second section k22 as the sections having a travel load less than or equal to the estimation threshold value TH1 are merged. The high-load section ks16 is a section into which the sixteenth section k16 to the twentieth section k20, the twenty-fourth section k24, and the twenty-fifth section k25 as the sections having a travel load greater than the estimation threshold value TH1 are merged.

Accordingly, the driving support unit 124 recombines all the sections of the travel route into the first section k01 to the fourteenth section k14 which are not merged, the low-load section ks15, and the high-load section ks16 and outputs the recombined result to the hybrid controller 108. That is, the total number of sections of the travel route output to the hybrid controller 108 is "16" which is the upper limit value Nmax. The driving support unit 124 calculates the travel loads f15, f16, that is, the estimated amounts of energy, of the low-load section ks15 and the high-load section ks16 (step of calculating an estimated amount of energy). The hybrid controller 108 can perform allocation of the driving mode based on the travel loads of all the sections, that is, appropriate allocation of the driving modes, to all the sections of the travel route by allocating the driving modes to all the sections of the travel route recombined in this way.

An example of a process of calculating the estimated amount of energy in the driving support unit 124 will be described below with reference to FIGS. 4 and 5. The driving support unit 124 calculates the estimated amount of energy on the basis of a predetermined condition. The predetermined condition may be a combination of one or more conditions of a condition that a predetermined period of time elapses, a condition that the travel distance is greater than a predetermined distance, a condition that the section in which the vehicle 100 travels is changed to a subsequent section, a condition that search of a route is re-performed due to a change of a route, a condition that an instruction is given from a driver, and the like.

Figure 4:
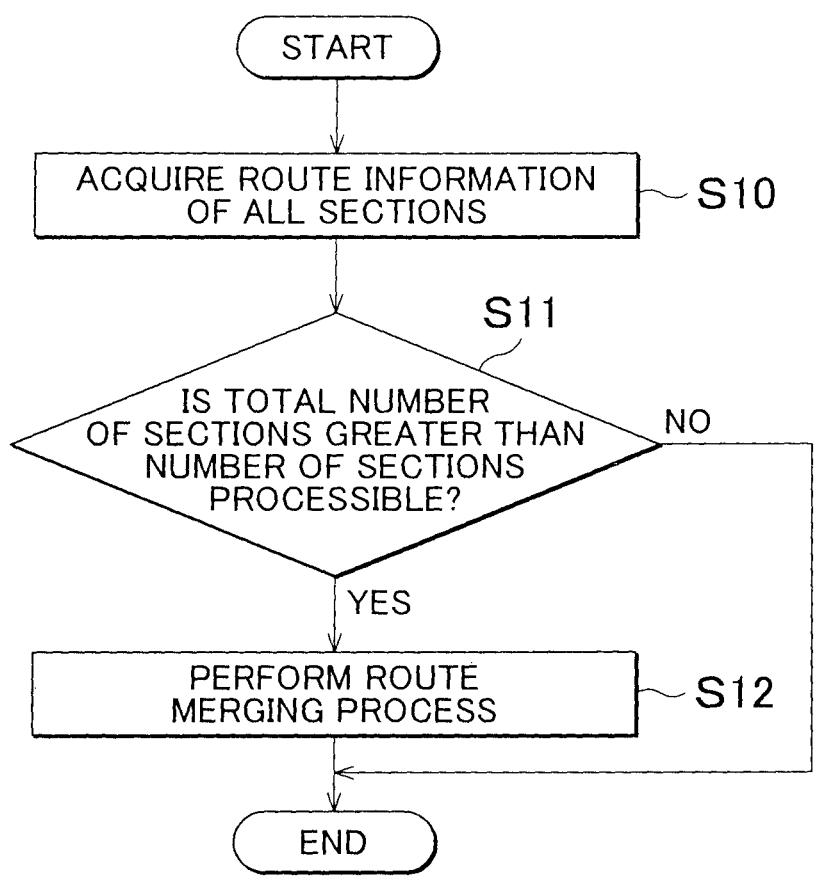
FIG. 4 is a flowchart illustrating a schematic process sequence of merging sections in the mobility information processing apparatus.

As illustrated in FIG. 4, when the process of calculating the estimated amount of energy is started, the driving support unit 124 acquires route information on all the sections of the travel route (step S10 of FIG. 4). Then, the driving support unit 124 determines whether the total number of sections of the acquired travel route is greater than the upper limit value Nmax which is the number of sections in control of the hybrid controller 108 (step S11 of FIG. 4). When it is determined that the number of sections of the acquired travel route is greater than the upper limit value Nmax (YES in step S11 of FIG. 4), the driving support unit 124 performs a route merging process (step S12 of FIG. 4) and ends the process of calculating the estimated amount of energy when the route merging process ends. On the other hand, when it is determined that the number of sections of the acquired travel route is not greater than the upper limit value Nmax (NO in step S11 of FIG. 4), the driving support unit 124 sets a route merging flag to "0" which indicates that the merging process is not performed and ends the process of calculating the estimated amount of energy.

Figure 5:
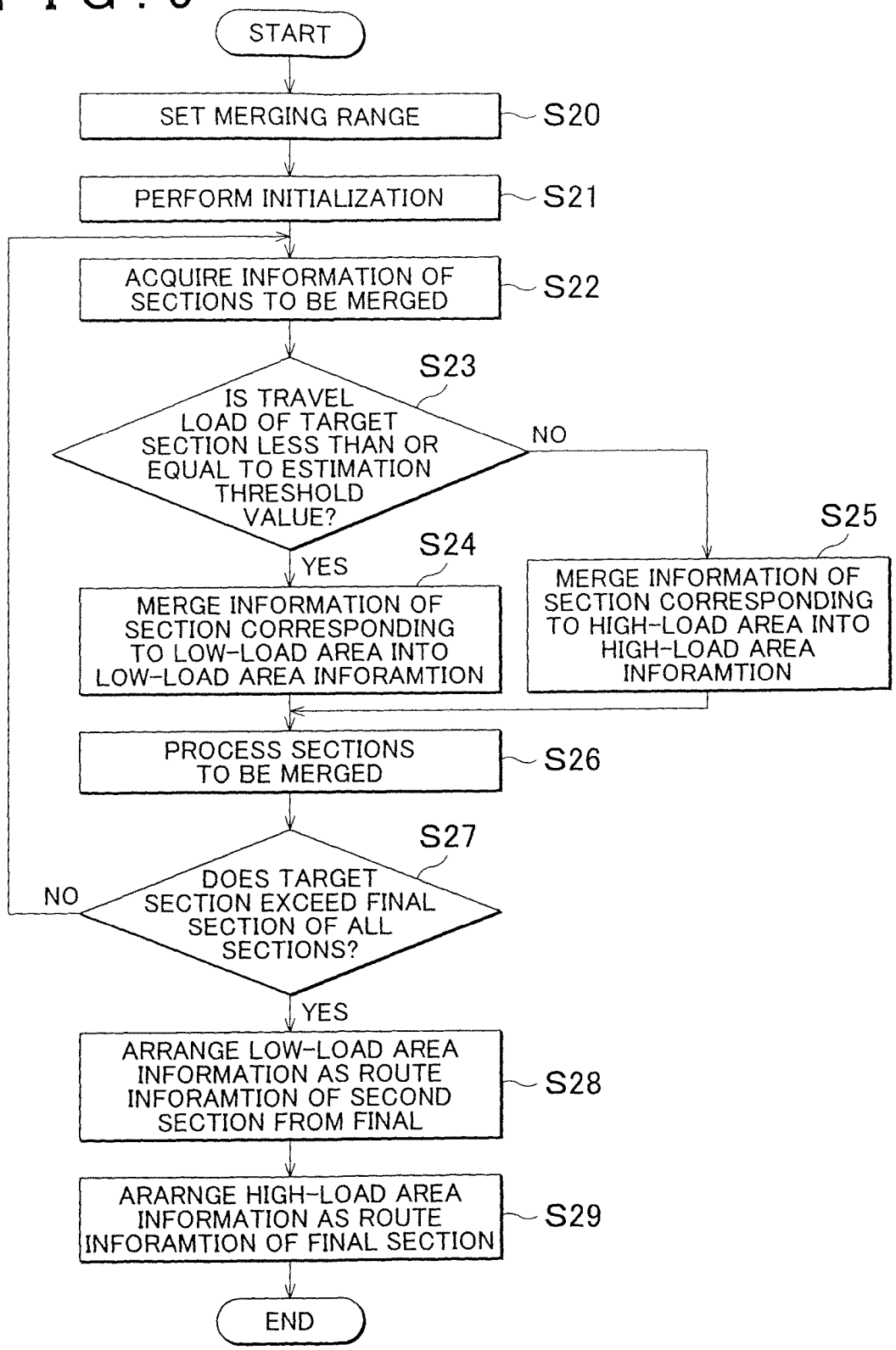
FIG. 5 is a flowchart schematically illustrating a detailed process sequence of merging sections in the mobility information processing apparatus.

As illustrated in FIG. 5, when the route merging process (step S12 of FIG. 4) is started, the driving support unit 124 sets a merging range (step S20 of FIG. 5) and initializes processing parameters (step S21 of FIG. 5). In the initialization, the sections not to be merged are set to from the current point (first, the start point Pa) to the "(upper limit value Nmax-2)-th" section, and the sections to be merged are set to from the "(upper limit value Nmax-1)-th" section to the final section (destination point Pb) of all the sections. In the initialization, the route merging flag is set to "1" which indicates that the merging process is performed.

Then, the driving support unit 124 sets one section selected from the merging range of the travel route, for example, the "(upper limit value Nmax-1)-th" section at the first time; as the target section and acquires the route information of the target section (step S22 of FIG. 5). Then, the driving support unit 124 determines whether the travel load of the target section is less than or equal to an estimation threshold value (step S23 of FIG. 5). When it is determined that the travel load of the target section is less than or equal to an estimation threshold value (YES in step S23 of FIG. 5), the driving support unit 124 determines that the travel load of the target section is low, merges the information of the target section with the low-load area information (step S24 of FIG. 5), and then performs the process of step S26. On the other hand, when it is determined that the travel load of the target section is higher than an estimation threshold value (NO in step S23 of FIG. 5), the driving support unit 124 determines that the travel load of the target section is high, merges the information of the target section into the high-load area information (step S25 of FIG. 5), and then performs the process of step S26.

Then, the driving support unit 124 processes the sections to be merged by processing the target section (step S26 of FIG. 5), and determines whether the previously-processed target section exceeds the final section of all the sections of the travel route (step S27 of FIG. 5). When it is determined that the previously-processed target section does not exceed the final section of all the sections of the travel route (NO in step S27 of FIG. 5), the driving support unit 124 continues to perform the merging process on the previously-processed target section again in step S22. On the other hand, when it is determined that the previously-processed target section exceeds the final section of all the sections of the travel route (YES in step S27 of FIG. 5), the driving support unit 124 sets the low-load area information as the route information of the "(upper limit value Nmax-1)-th" section (the second section from the final) of the travel route transmitted to the hybrid controller 108. The driving support unit 124 sets the high-load area information as the route information of the "(upper limit value Nmax)-th" section (the final section) (step S29 of FIG. 5). Then, the driving support unit 124 ends the route merging process.

Thereafter, the driving support unit 124 outputs the travel route, which includes the non-merged sections less than the "(upper limit value Nmax-2)-th" section, the "(upper limit value Nmax-1)-th" section having the low-load area information, and the "(upper limit value Nmax)-th" section having the high-load area information and in which the number of sections is the "upper limit value Nmax", to the hybrid controller 108.

An example of a process sequence of allocating a driving mode in the hybrid controller 108 will be described below with reference to FIGS. 6 to 8. The hybrid controller 108 allocates the driving modes to the sections of the travel route whenever the travel route is transmitted from the driving support unit 124.

Figure 6:
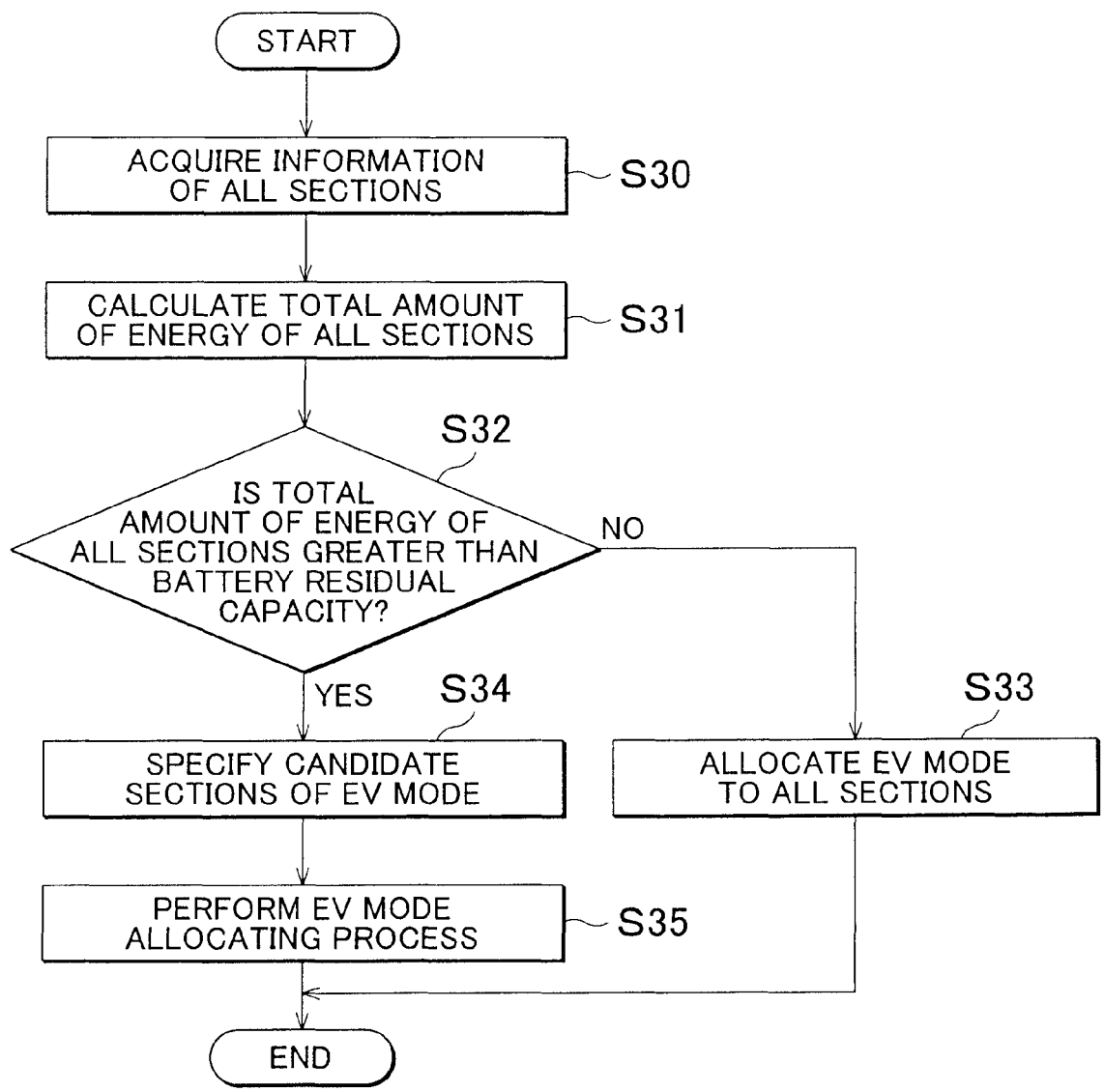
FIG. 6 is a flowchart illustrating a schematic process sequence of allocating an EV mode to sections of a travel route in the mobility information processing apparatus.

As illustrated in FIG. 6, the hybrid controller 108 acquires information of the sections of the travel route up to the "(upper limit value Nmax)-th" section from the driving support unit 124, that is, information of all the sections transmitted from the driving support unit 124 (step S30 of FIG. 6). The hybrid controller 108 calculates the total amount of energy, that is, the total sum of the complete travel loads, on the basis of the information of all the sections (step S31 of FIG. 6) and determines whether the total amount of energy of all the sections is greater than the battery residual capacity (step S32 of FIG. 6). When it is determined that the total amount of energy of all the sections is not greater than the battery residual capacity (NO in step S32 of FIG. 6), the hybrid controller 108 allocates the EV mode to all the sections and ends the process of allocating the driving mode.

On the other hand, when it is determined that the total amount of energy of all the sections is greater than the battery residual capacity (YES in step S32 of FIG. 6), the hybrid controller 108 specifies the sections that will be an EV mode allocation candidate among all the sections as candidate sections (step S34 of FIG. 6). The hybrid controller 108 performs a process of allocating the EV mode to the specified candidate sections (step S35 of FIG. 6) (step of determining whether to allocate the one selected driving mode). Then, the hybrid controller 108 ends the process of allocating the driving mode.

Figure 7:
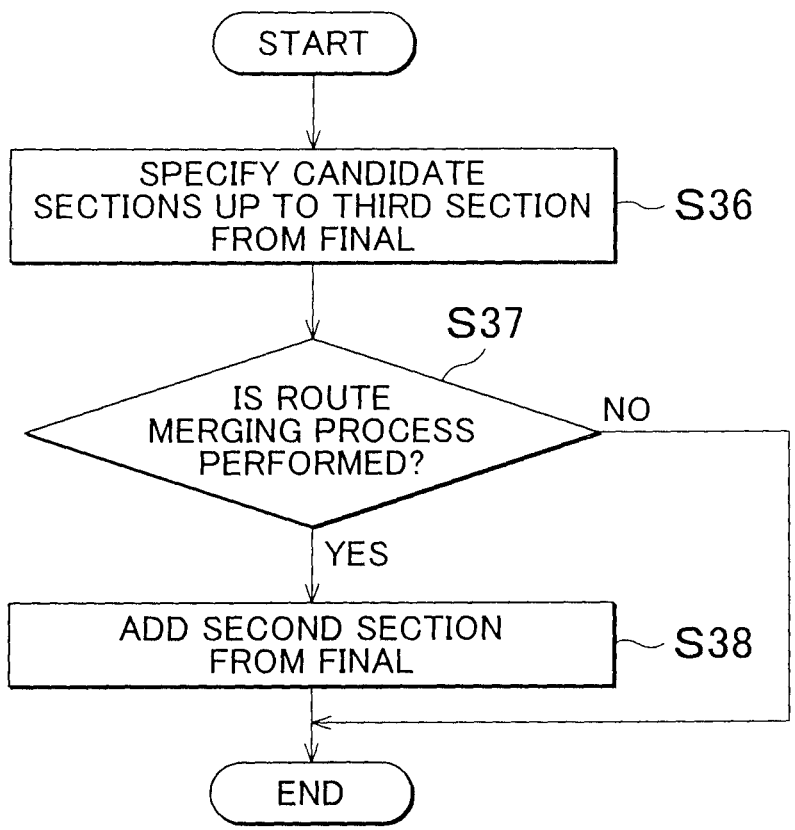
FIG. 7 is a flowchart illustrating a process sequence of specifying candidate sections to which an EV mode will be allocated and which include merged sections of a travel route in the mobility information processing apparatus.

As illustrated in FIG. 7, when the process (step S34 of FIG. 6) of specifying the sections to which the EV mode is allocated as the candidate sections is started, the hybrid controller 108 specifies the sections, which are candidate sections of the EV mode, of from the first section to the third section from the final, that is, the "(upper limit value Nmax-2)-th" section among all the sections (step S36 of FIG. 7). The condition that a section is an candidate section of the EV mode includes a condition that the average vehicle speed in the section is less than a predetermined value and a condition that the average travel load in the section is less than or equal to a predetermined value (switching threshold value). Subsequently, it is determined whether the travel route should be subjected to the route merging process (step S37 of FIG. 7). The hybrid controller 108 determines that the route merging process is performed when the route merging flag is set to "1", and determines that the route merging process is not performed when the route merging flag is set to "0". When it is determined that the route merging process is performed (YES in step S37 of FIG. 7), the hybrid controller 108 specifies the second section from the final among all the sections, that is, the "(upper limit value Nmax-1)-th" section, as the candidate section and ends the process of specifying the candidate section. On the other hand, when it is determined that the route merging process is not performed (NO in step S37 of FIG. 7), the hybrid controller 108 ends the process of specifying the candidate section.

Figure 8:
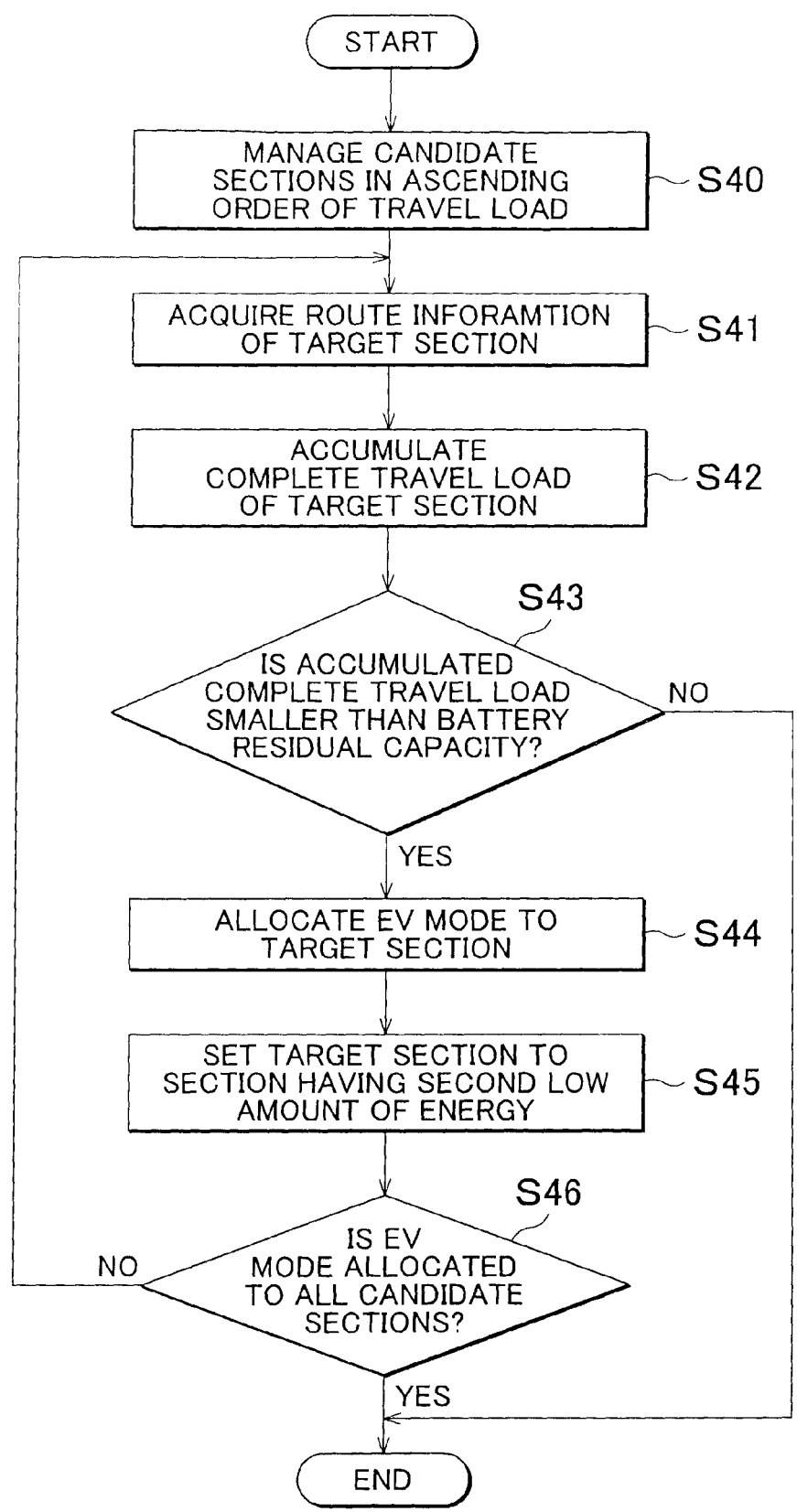
FIG. 8 is a flowchart illustrating a process sequence of allocating an EV mode to candidate sections including merged sections of a travel route in the mobility information processing apparatus.

As illustrated in FIG. 8, when the process of allocating the EV mode (step S35 of FIG. 6) is started, the hybrid controller 108 manages the candidate sections in the ascending order of the travel load, that is, the amount of energy required for traveling (step S40 of FIG. 8). The management in the ascending order may be management in which the sections are arranged in the ascending order or management in which the sections are arranged in the ascending order or with numbers or priorities given thereto. Then, the hybrid controller 108 acquires route information of one target section specified from the candidate sections (step S41 of FIG. 8). The one specified target section is a section having the smallest amount of energy out of the sections to which the EV mode is not yet allocated. The hybrid controller 108 accumulates the complete travel load of the one specified target section onto the total sum of complete travel loads of the sections which are the target, sections up to now (step S42 of FIG. 8).

Then, the hybrid controller 108 determines whether the accumulated amount of complete travel loads is smaller than the battery residual capacity (step S43 of FIG. 8). When it is determined that the accumulated amount of complete travel loads is not smaller than the battery residual capacity (NO in step S43 of FIG. 8), the hybrid controller 108 ends the process of allocating the EV mode.

On the other hand, when it is determined that the accumulated amount of complete travel loads is smaller than the battery residual capacity (YES in step S43 of FIG. 8), the hybrid controller 108 allocates the EV mode to the target section (step S44 of FIG. 8) and sets a section having a secondly smallest amount of energy as a new target section (step S45 of FIG. 8). Then, the hybrid controller 108 determines whether the EV mode is allocated to all the candidate sections (step S46 of FIG. 8). When it is determined that the EV mode is not allocated to all the candidate sections (NO in step S46 of FIG. 8), the hybrid controller 108 returns the process to step S41 and performs the processes of step S41 and the steps subsequent thereto on the new target section. On the other hand, when it is determined that the EV mode is allocated to all the candidate sections (YES in step S46 of FIG. 8), the hybrid controller 108 ends the process of allocating the EV mode to the candidate section.

According to this embodiment, in the vehicle 100 including plural driving modes, it is possible to provide a mobility information processing apparatus, a mobility information processing method, and a driving support system that can allocate appropriate driving modes to the sections even when the number of sections of the travel route is greater than the number of sections in control of the hybrid controller 108.

As described above, in the mobility information processing apparatus, the mobility information processing method, and the driving support system according to this embodiment, the following advantages can be achieved. (1) The estimated amounts of energy of the sections to which the EV mode will be allocated among the sections located apart from the predetermined point, that is, the sections located exceeding the upper limit value Nmax are calculated. Then, it is determined whether to allocate the EV mode to the sections up to the predetermined point on the basis of the battery residual capacity from which the estimated amount of energy is subtracted. Accordingly, even when the mode allocating unit 108a cannot process the sections exceeding the upper limit value Nmax, it is possible to allocate the EV mode to the sections up to the predetermined point while securing the battery residual capacity (the residual amount of energy) so as to allocate the EV mode to the sections exceeding the upper limit value Nmax. Accordingly, for example, even when the travel route includes plural sections, it is possible to appropriately allocate the EV mode to all the sections.

(2) Since the processing capability of the mode allocating unit 108a is determined depending on the number of sections, the driving modes can be appropriately set to the sections of the travel route exceeding the upper limit value Nmax as the upper limit thereof.

(3) Regarding the EV mode and the HV mode as the driving modes which are generally included by a vehicle including plural modes, such as a hybrid vehicle, the EV mode in which the vehicle 100 travels by the use of the electric motor using the rechargeable battery 110 as the power source can be appropriately allocated to the sections of the travel route of the hybrid vehicle.

(4) The energy balance of each section is calculated depending on the travel load. By allocating the EV mode, which tends to have high efficiency when it is applied to a section having a low travel load, to a section having a low travel load, it is possible to set an efficient mode. The amount of energy may be equal to the travel load or the amount of energy may be calculated from the travel load.

(5) Since the EV mode is allocated to the sections of the travel route in the ascending order of the travel loads; the EV mode which tends to have high efficiency when it is applied to a section having a low travel load can be appropriately allocated to the sections of the travel route.

(6). The EV mode estimation is performed by the mode estimating unit 124a on the basis of the travel load. Accordingly, the EV mode can be suitably allocated to all the sections of the travel route.

(7) The sections estimated to allocate the EV mode thereto can be merged into one section. This one merged section can be processed by the mode allocating unit 108a. Accordingly, the merged section may be processed by the mode allocating unit 108a. For example, when there is no margin in the processing of the mode allocating unit 108a, the merged section may be processed by moving the predetermined point to a position close to the current point of the vehicle 100 to form a margin in the processing of the mode allocating unit 108*a*.

(8) When the EV mode can be allocated to the sections including the sections exceeding the upper limit value Nmax, the allocation of the driving mode can be simplified by allocating the EV mode to all the sections. (9) The allocation of the driving mode can be performed by the vehicle 100 itself requiring the allocation, for example, the hybrid vehicle itself, thereby enhancing convenience.

Second Embodiment

A second embodiment of a mobility information processing apparatus, a mobility information processing method, and a driving support system will be described with reference to FIGS. 9, 10A and 10B.

This embodiment and the first embodiment are different from each other in the travel route merging configuration, but are equal to each other in the other configurations. Accordingly, the configuration different from the first embodiment will be mainly described below, and the same configurations as in the first embodiment will be referenced by the same reference numerals and detailed description thereof will not be repeated for the purpose of convenience of explanation.

Figure 9:
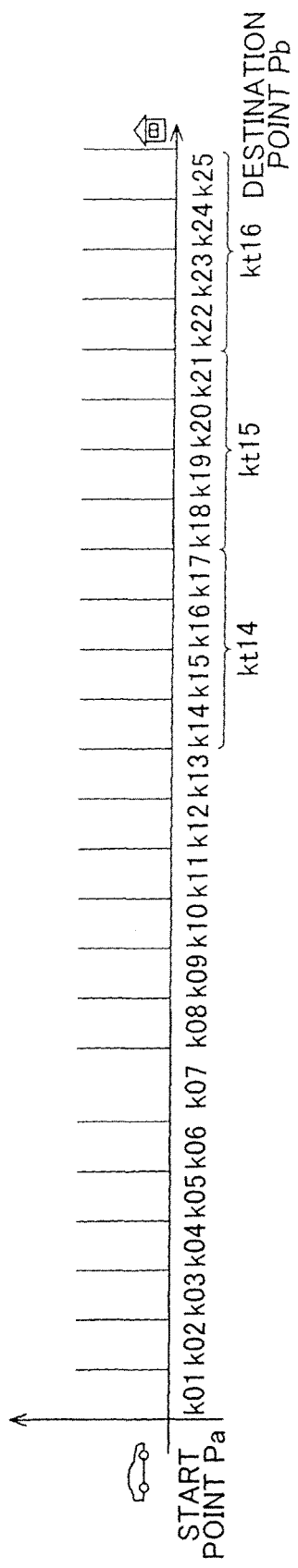
FIG. 9 is a diagram schematically illustrating sections of a travel route that are processed by a second embodiment of a mobility information processing apparatus and an example of merged sections therein.

As illustrated in FIG. 9, when a travel route is defined to have a start point Pa to a destination point Pb, it is assumed that the travel route searched by the navigation system 112 includes 25 sections of a first section k01 to a twenty-fifth k25. It is also assumed that each of the first section k01 to the twenty-fifth section k25 includes information on the travel load for each section. It is assumed that the upper limit value Nmax which is the number of sections in control of the hybrid controller 108 is "16" and "16" is set as the upper limit value Nmax in the driving support unit 124.

The driving support unit 124 merges plural continuous sections among the sections apart from the current point into one section on the basis of a predetermined section length. In this embodiment, a maximum section length of a merged section is determined and continuous sections within the range not exceeding the maximum section length are merged into one section. In this embodiment, it is assumed that the section length of the section into which four continuous sections are merged is not greater than the maximum section, length for the purpose of convenience of explanation. For example, the driving support unit 124 merges the fourteenth section k14 to the seventeenth section k17 into a first merged section kt14, merges the eighteenth section k18 to the twenty-first section k21 into a second merged section kt15, and merges the twenty-second section k22 to the twenty-fifth section k25 into a third merged section kt16. As long as the length of the merged section does not exceed the maximum section length, the number of sections to be merged may be three or less or may be five or more. On the other hand, the driving support unit 124 does not merge the thirteen sections from the first section k01 to the thirteenth section k13. Accordingly, the driving support unit 124 recombines all the sections of the travel route into thirteen sections of the first section k01 to the thirteenth section k13 and three sections of the first to third merged sections kt14 to kt16, and sets the number of sections of all the sections of the travel route output to the hybrid controller 108 to "16" which is the upper limit value Nmax.

An example of the route merging process in the driving support unit 124 will be described below with reference to FIGS. 10A and 10B. The driving support unit 124 performs the route merging process on the basis of a predetermined condition. The predetermined condition may be a combination of one or more conditions of a condition that a predetermined period of time elapses, a condition that the travel distance is greater than a predetermined distance, a condition that the section in which the vehicle 100 travels is changed to a subsequent section, a condition that search of a route is re-performed, a condition that an instruction is given from a driver, and the like.

Figure 10A:
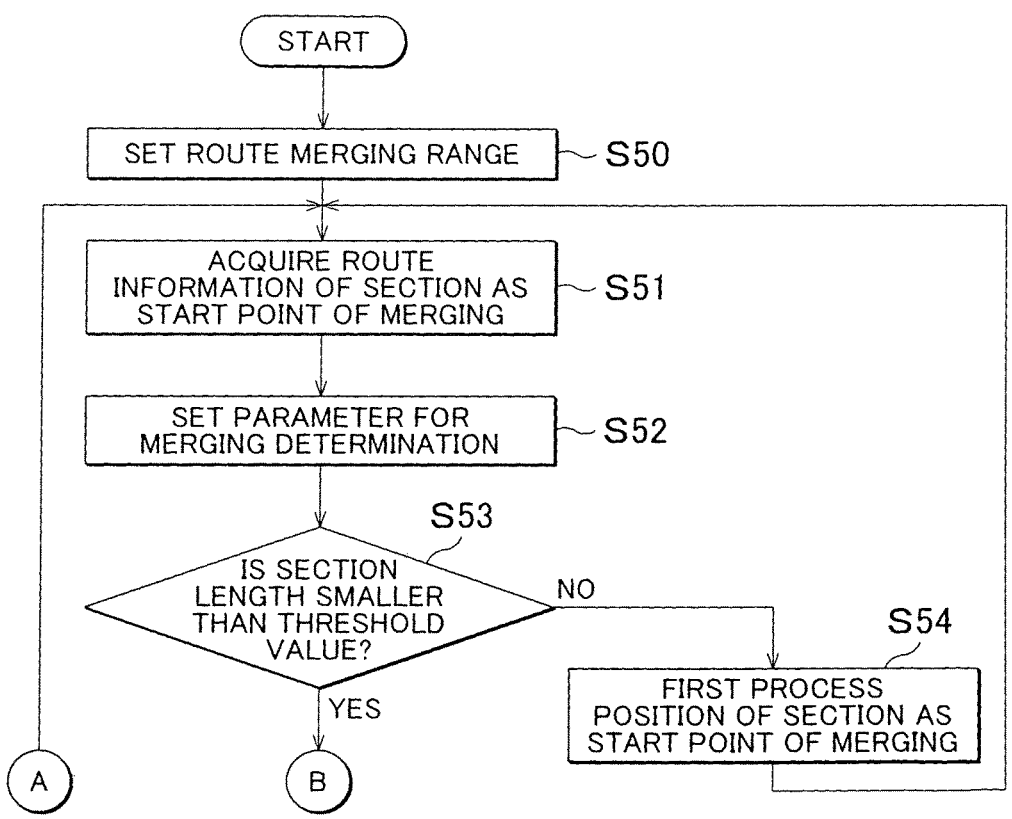
FIGS. 10A and 10B are flowcharts illustrating a process sequence of merging sections in the mobility information processing apparatus.

As illustrated in FIG. 10A, when the route merging process is started, the driving support unit 124 adjusts the total number of sections of the travel route so that the total number of sections of the acquired travel route is not greater than the upper limit value Nmax. That is, the driving support unit 124 determines the number of sections not to be merged in the travel route and the number of sections to be merged and sets the range of the sections to be merged (step S50 in FIG. 10A). The driving support unit 124 acquires the route information of the section from which the merging is started (step S51 of FIG. 10A). The hybrid controller 108 selects the fourteenth section k14 at the first time as the section from which the merging is started. Subsequently, the hybrid controller sets a parameter for determining the merging (step S52 of FIG. 10A). Examples of the parameter for determining the merging include the position of the section from which the merging is started and a section length threshold value indicating the maximum section length of the merged sections. The driving support unit 124 compares the section length of the section from which the merging is started with the section length threshold value and determines whether the section length is smaller than the section length threshold value (step S53 of FIG. 10A). When it is determined that the section length is not smaller than the section length threshold value (NO in step S53 of FIG. 10A), the driving support unit 124 first processes the position of the section from which the merging is started (step S54 of FIG. 10A), returns the process to step S51, and continues to perform the route merging process on the basis of a new section from which the merging is started. That is, at this time, the section selected as the section from which the merging is started in step S51 is not merged with another section and a section subsequent to this section is a new section from which the merging is started.

Figure 10B:
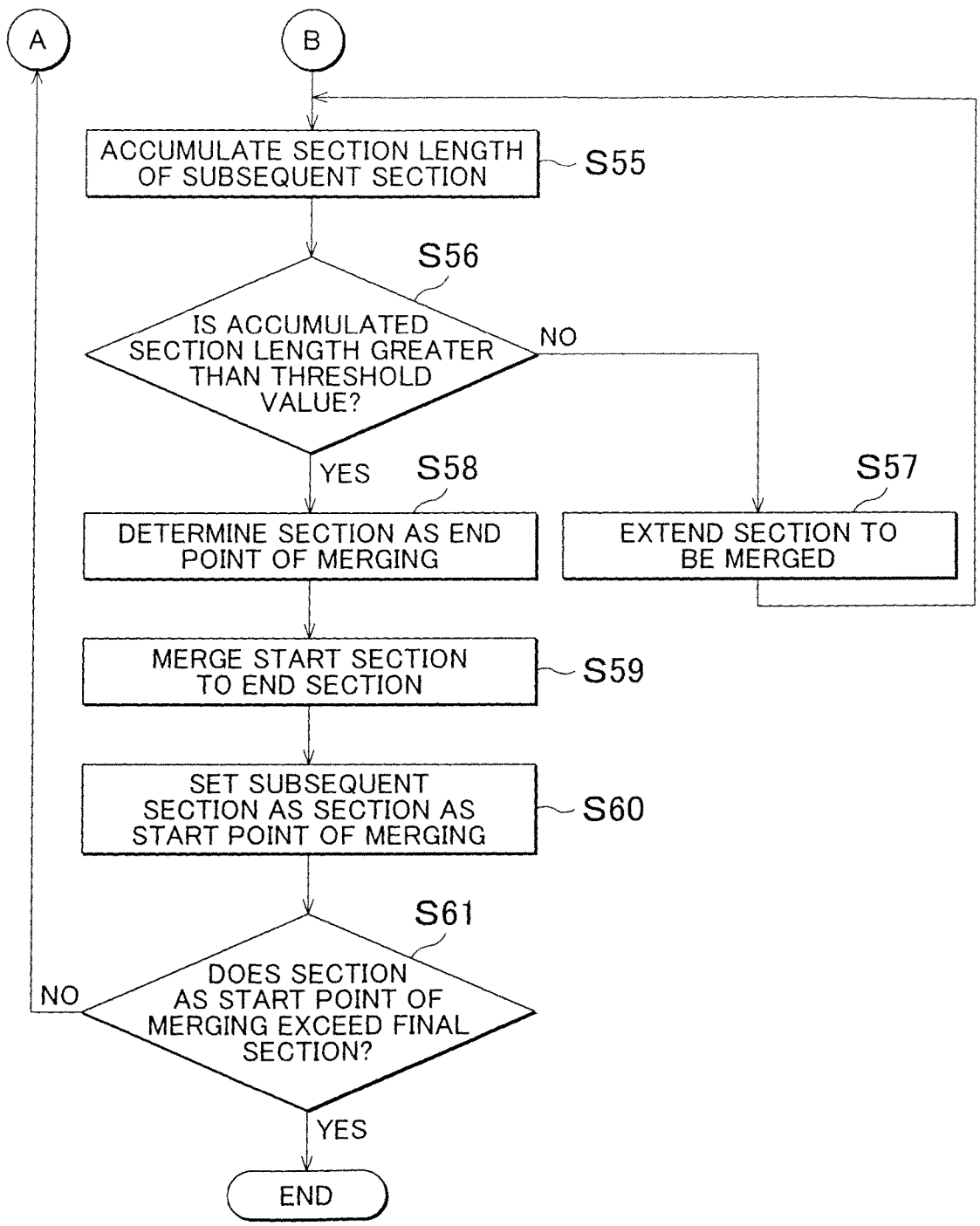

On the other hand, when it is determined that the section length is smaller than the section length threshold value (YES in step S53 of FIG. 10A), the driving support unit 124 accumulates the section length of the next section onto the section length of the section so as to check whether the next section can be merged (step S55 of FIG. 10B). Then, the driving support unit 124 compares the accumulated section length of the sections with the section length threshold value and determines whether the accumulated section length is larger than the section length threshold value (step S56 of FIG. 10B). When it is determined that the accumulated section length is not larger than the section length threshold value (NO in step S56 of FIG. 10B), the driving support unit 124 increases the number of sections to be merged, that is, extends the sections (step S57 of FIG. 10B), returns the process to step S55, and continues to check whether the next section can be merged.

On the other hand, when it is determined that the accumulated section length is larger than the section length threshold value (YES in step S56 of FIG. 10B), the driving support unit 124 determines a section as an end point of the sections to be merged (step S58 of FIG. 10B). The section which is the end point may be a section exceeding the section length threshold value or, may be a section just before exceeding the section length threshold value. The driving support unit 124 merges the sections from the section from which the merging is started to the section which is the end point of the sections to be merged into one merged section (step S59 of FIG. 10B), and determines the next section as a new section from which the merging is started (step S60 of FIG. 10B). Then, it is determined whether the next section exceeds the final section of all the sections of the travel route (step S61 of FIG. 10B). When it is determined that the next section does not exceed the final section of all the sections of the travel route (NO in step S61 of FIG. 10B), the driving support unit 124 returns the process to step S51 and continues to perform the route merging process on the new section from which the merging is started. On the other hand, when it is determined that the next section exceeds the final section of all the sections of the travel route (YES in step S61 of FIG. 10B), the driving support unit 124 ends the route merging process.

As described above, in the mobility information processing apparatus, the mobility information processing method, and the driving support system according to this embodiment, the following advantage can be achieved in addition to the advantages (2) to (5), (8), and (9) described in the first embodiment.

(10) When the number of sections of the travel route is greater than the upper limit value Nmax, the neighboring sections located apart from the start point Pa are merged to reduce the number of sections to the upper limit value Nmax. Accordingly, it is possible to appropriately allocate the driving modes to the sections of the travel route including the number of sections greater than the upper limit value Nmax.

Third Embodiment

A third embodiment of a mobility information processing apparatus, a mobility information processing method, and a driving support system will be described with reference to FIGS. 11 to 17.

This embodiment and the first embodiment are different from each other, in that the route information of the sections of the travel route is acquired from an external center in this embodiment but the route information of all the sections of the travel route is internally acquired in the first embodiment, but are equal to each other in the other configurations. Accordingly, the configuration different from the first embodiment will be mainly described below, and the same configurations as in the first embodiment will be referenced by the same reference numerals and detailed description thereof will not be repeated for the purpose of convenience of explanation.

Figure 11:
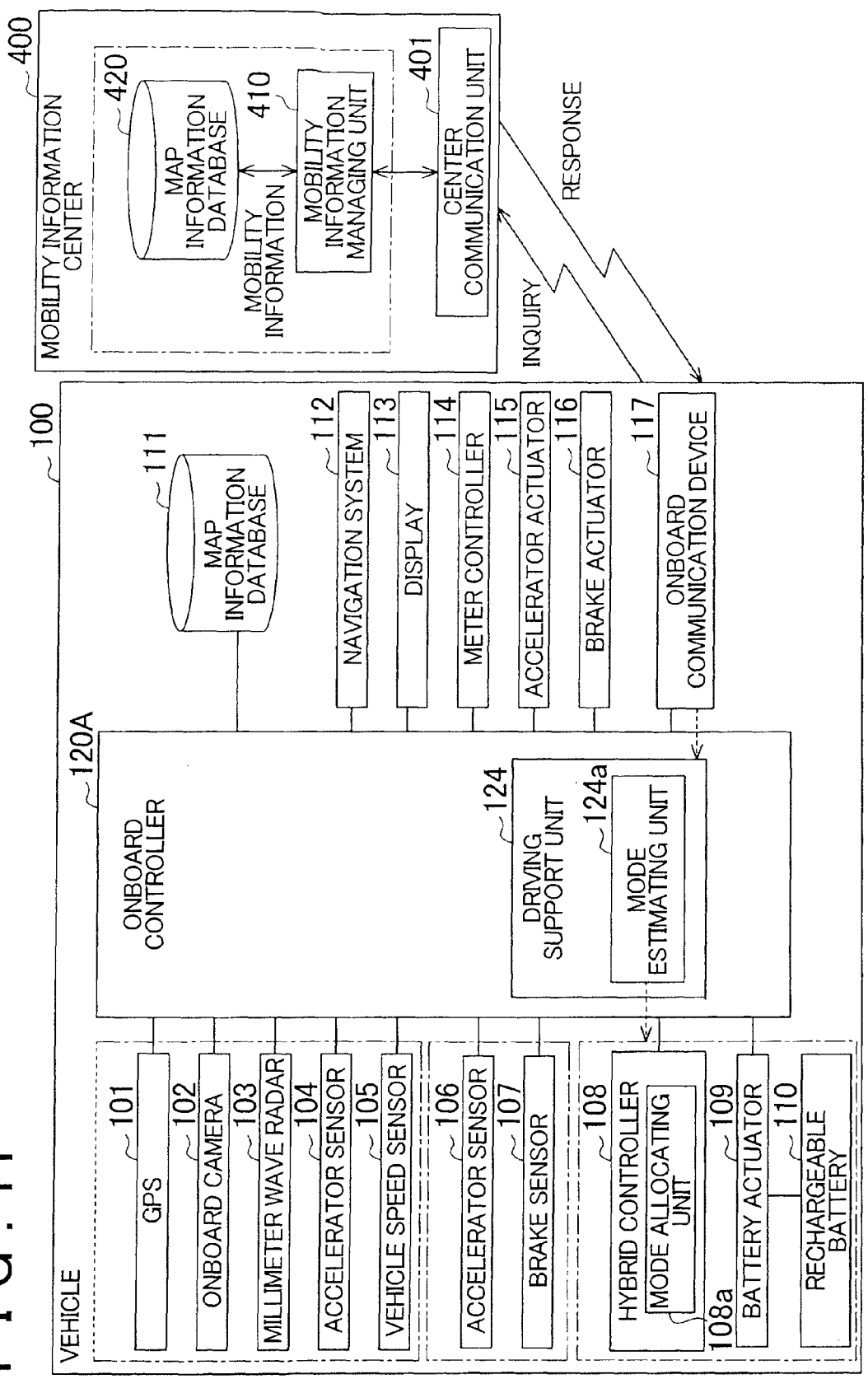
FIG. 11 is a block diagram schematically illustrating a configuration of a third embodiment of a mobility information processing apparatus.

As illustrated in FIG. 11, the vehicle 100 is provided with a vehicle communication unit 117 that wirelessly communicates with an external apparatus such as a mobility information center 400. The vehicle communication unit 117 is electrically connected to an onboard controller 120A. The vehicle communication unit 117 acquires mobility information or road information managed by the mobility information center 400 by wireless communication with the mobility information center 400, and outputs the acquired road information or the like to the onboard controller 120A.

The mobility information center 400 includes a center communication unit 401 that communicates with vehicles such as the vehicle 100 or a road traffic information center, a mobility information managing unit 410 that manages inquiries and responses thereto acquired by the center communication unit 401, and a map information database 420 in which map data is registered. The map data is data relevant to geography such as roads. In the map data, data capable of displaying geography and information on positions such as latitude and longitude are registered. The map data of the map information database 420 of the mobility information center 400 is expected to have a larger area, a larger amount of information, higher-accuracy data, in comparison with the map information database 111 of the vehicle 100.

The mobility information managing unit 410 of the mobility information center 400 has a function of searching the map information database 420 for a travel route inquired from the vehicle 100 and returning the travel route obtained as the search result. Here, since the vehicle 100 and the mobility information center 400 transmit and receive information to and from by wireless communication, the amount of data capable of being transmitted and received or the transmission rate may be limited.

The form in which the vehicle 100 acquires the travel route from the mobility information center 400 will be described below with reference to FIG. 12. For example, the vehicle 100 acquires the travel route from the mobility information center 400 when the amount of information of the map information database 111 is not sufficient.

Figure 12:
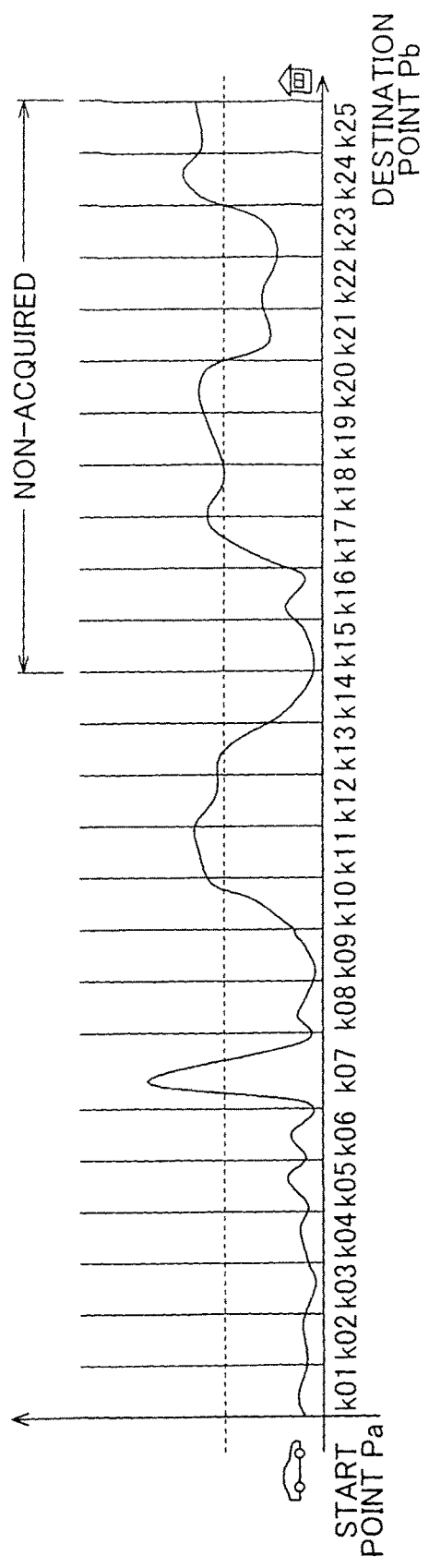
FIG. 12 is a diagram schematically illustrating sections in a travel route that are processed by the mobility information processing apparatus.

As illustrated in FIG. 12, the vehicle 100 inquires the travel route from the start point Pa to the destination point Pb from the mobility information center 400. That is, the vehicle 100 inquires the travel route from the start point Pa to the destination point Pb from the mobility information center 400 by outputting the position information of the start point Pa and the position information of the destination point Pb. The mobility information center 400 searches for the route on the basis of the position information of the start point Pa and the position information of the destination point Pb from the vehicle 100, and acquires, for example, a travel route including twenty five sections of the first section k01 to the twenty-fifth section k25. Then, the mobility information center 400 returns the acquired travel route to the vehicle 100.

At this time, the number of sections of the travel route acquired by the mobility information center 400 greatly varies depending on the distance to a destination, the road environments of the travel route, the compactness of the partitioned sections, and the like. For example, the number of sections tends to increase as the distance from the current point to the destination point becomes larger, as the road environment gets closer to urban, and as the sections are more finely partitioned. Accordingly, the number of sections of the travel route exceeds the capacity or the number of sections (for example, the upper limit value Nmax) which can be received by the onboard controller 120A of the vehicle 100, the travel route acquired by the vehicle 100 may be limited to from the start point Pa (section k01) to a point (section k14) before the destination point Pb. In addition, when the mobility information center 400 limits the amount of data to be returned for each communication line, only the travel route from the start point Pa to a point before the destination point Pb is obtained.

Because of this limitation, it is assumed that the travel route which is returned from the mobility information center 400 to the vehicle 100 includes only the first section k01 to the fourteenth section k14 among all the sections of the travel route, and the fifteenth section k15 to the twenty-fifth section k25 exceeding the upper limit value Nmax of the number of sections are, not acquired. At this time, when the vehicle 100 allocates the driving modes to only the first section k01 to the fourteenth section k14, the driving modes may not be appropriately allocated to the fifteenth section k15 to the twenty-fifth section k25.

Therefore, the driving support unit 124 of this embodiment allocates the driving modes to the acquired sections (the first section k01 to the fourteenth section k14) on the assumption that the travel route includes the non-acquired sections (the fifteenth section k15 to the twenty-fifth section k25). Accordingly, the driving modes can be appropriately allocated to the non-acquired sections (the fifteenth section k15 to the twenty-fifth section k25) in the travel route in a process after acquiring the non-acquired sections.

An example of the driving mode allocating process in the driving support unit 124 will be described below with reference to FIGS. 13 to 17. As illustrated, in FIG. 13, when the travel route from the start point Pa to the destination point Pb is received from the mobility information center 400, the driving support unit 124 starts allocating of the driving modes to the sections of the travel route depending on the attribute information thereof. When the allocating of the driving mode is started, the driving support unit 124 acquires information of the sections of the travel route (step S70 of FIG. 13). The information of the sections includes link data or the like. The information included in the link data is section attributes and includes data indicating road types as attribute information such as an expressway, a toll road, a roadway, an urban/suburban road, and a mountain road.

Subsequently, the driving support unit 124 determines whether data of all the sections of the travel route is not acquired (step S71 of FIG. 13). Whether the data of all the sections of the travel route is not acquired can be determined on the basis of information that a section including the target point Pb is not included in the acquired, sections. When it is determined that data of all the sections of the travel route is acquired (NO in step S71 of FIG. 13), the driving support unit 124 acquires data of all the sections and thus normally allocates the driving modes including the EV mode (step S73 of FIG. 13). At this time, the allocating of the driving modes to all the sections of the travel route may be performed by the driving support unit 124 or may be performed by the hybrid controller 108. When it is determined that data of all the sections of the travel route is not acquired (YES in step S71 of FIG. 13), the driving support unit 124 allocates the driving modes including the EV mode on the premise that data of all the sections of the travel route is not acquired (step S72 of FIG. 13). The hybrid controller 108 switches the driving mode of the vehicle 100 depending on the section in which the vehicle travels on the basis of the allocated driving modes of all the sections of the travel route.

Figure 13:
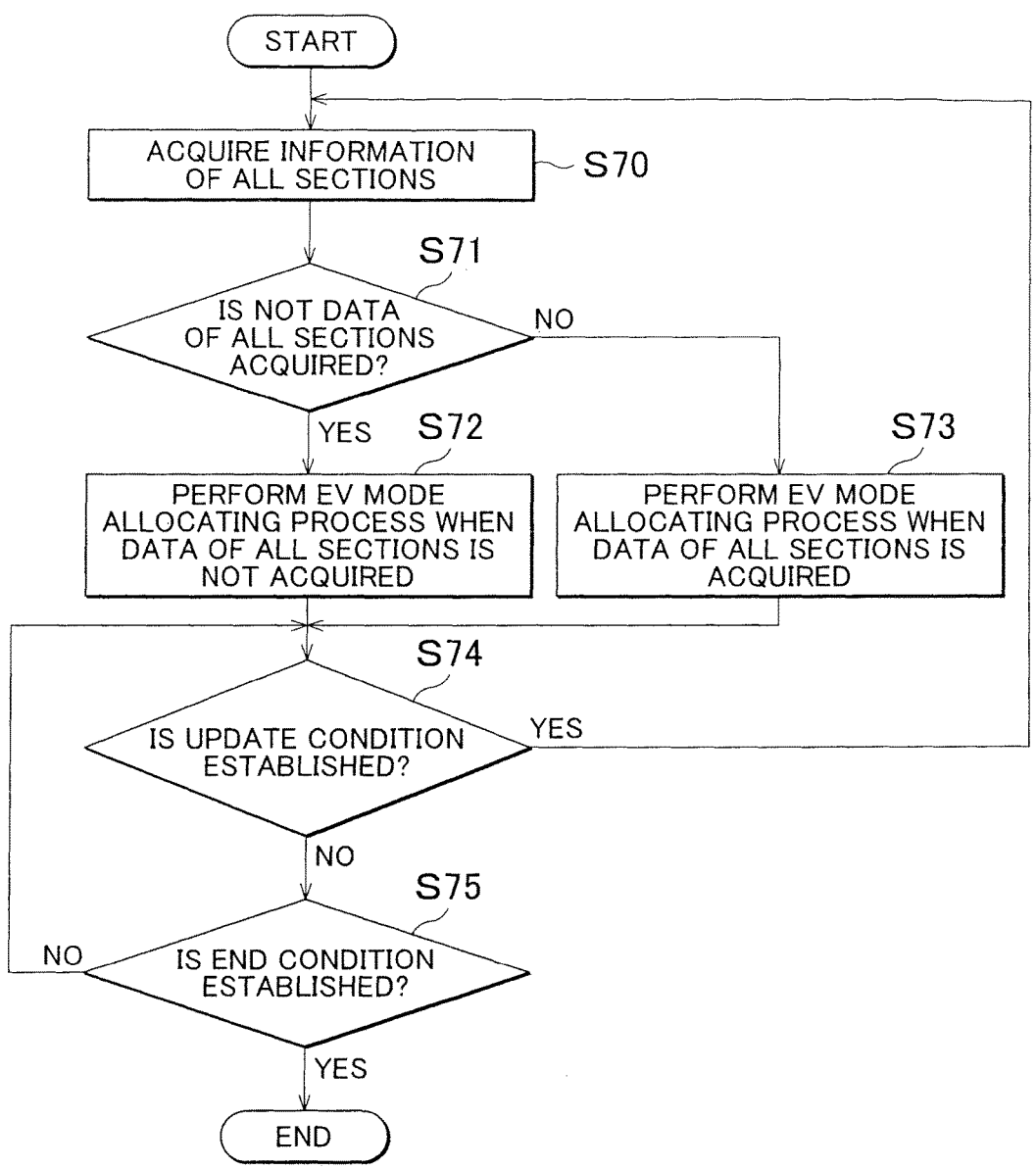
FIG. 13 is a flowchart illustrating a schematic process sequence of allocating an EV mode to sections of a travel route in the mobility information processing apparatus.

Then, the driving support unit 124 determines whether an update condition is established (step S74 of FIG. 13). The update condition may be a combination of one or more conditions of a condition that a predetermined period of time elapses, a condition that the travel distance is greater than a predetermined distance, a condition that the section in which the vehicle 100 travels is changed to a subsequent section, a condition that search of a route is re-performed due to a change of a route, a condition that an instruction is given from a driver, and the like.

When it is determined that an update condition is established (YES in step S74 of FIG. 13), the driving support, unit 124 newly receives the travel route from the current point to the destination point Pb from the mobility information center 400 and performs the processes of step S70 and steps subsequent thereto on the basis of the newly-received travel route.

On the other hand, when it is determined that an update condition is not established (NO in step S74 of FIG. 13), the driving support unit 124 determines whether an ending condition is established (step S75 of FIG. 13). The ending condition may be a condition that the vehicle arrives at the destination point Pb, a condition that the rechargeable battery 110 is exhausted; or a condition that an ignition switch is turned off. When it is determined that an update condition is not established (NO in step S75 of FIG. 13), the driving support unit 124 returns the process to step S74. On the other hand, when it is determined that an update condition is established (YES in step S74 of FIG. 13), the driving support unit 124 ends the allocating of the driving modes including the EV mode.

Figure 14:
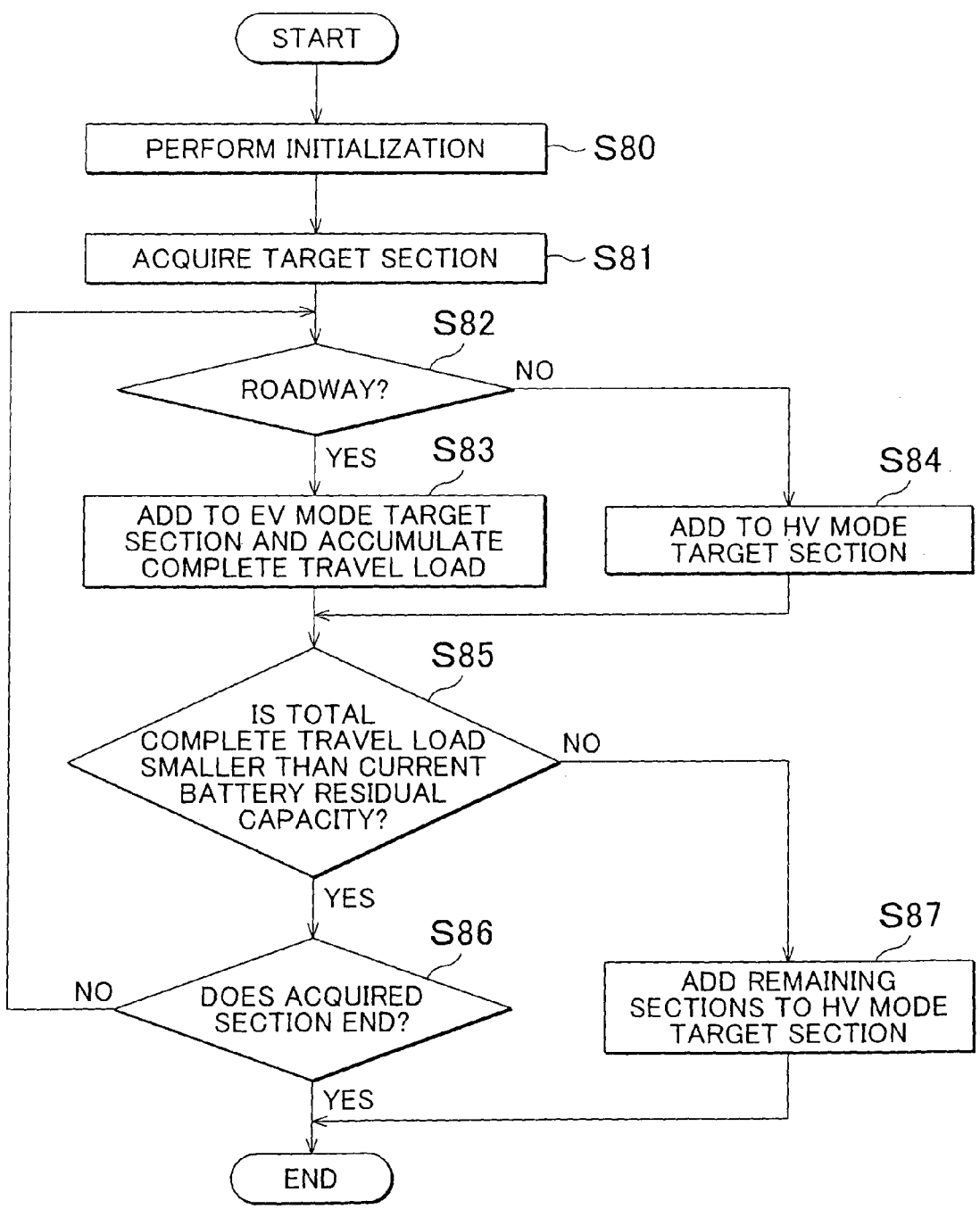
FIG. 14 is a flowchart illustrating a process sequence of allocating an EV mode to some sections of a travel route in the mobility information processing apparatus.

As illustrated in FIG. 14, when the allocating of the driving modes including the EV mode (step S72 of FIG. 13) is started in a state where the data of all the sections of the travel route is not acquired, the driving support unit 124 initializes the processing parameter or the like (step S80 of FIG. 14) and acquires route information of the sections included in the travel route (step S81 of FIG. 14). Then, with reference to attribute information (section attribute) of one section selected from the sections included in the travel route, the driving support unit 124 determines whether the one selected section is a roadway (step S82 of FIG. 14). That is, the "roadway" is used as the attribute condition. The one selected section is selected sequentially in a direction getting distant from the current point from the sections included in the travel route. When it is determined that the selected section is not a roadway (NO in step S82 of FIG. 14), the driving support unit 124 adds the selected section to the target sections of the HV mode (step S84 of FIG. 14). On the other hand, when it is determined that the selected section is a roadway (YES in step S82 of FIG. 14), the driving support unit 124 adds the selected section to the target sections of the EV mode and calculates the total complete travel load in which the complete travel roads of the target sections of the EV mode up to now are accumulated and which includes the complete travel load of this target section.

The driving support unit 124 compares the total complete travel load with the battery residual capacity and determines whether the total complete travel load is smaller than the battery residual capacity (step S85 of FIG. 14). When it is determined that the total complete travel load is not smaller than, that is, larger than, the battery residual capacity (NO in step S85 of FIG. 14), the driving support unit 124 adds all the sections not yet selected as the target section to the target sections of the HV mode. Then, the driving support unit 124 ends the allocating of the driving modes.

On the other hand, when it is determined that the total complete travel load is smaller than the battery residual capacity (YES in step S85 of FIG. 14), the driving support unit 124 determines whether a section to be selected in the next time is not present in the acquired travel route, that is, whether all the sections of the travel route are finished (step S86 of FIG. 14). When it is determined that all the sections of the travel route are not finished (NO in step S86 of FIG. 14), the driving support unit 124 selects an immediately-previous section, returns the process to step S82, and continues to allocate the driving mode. On the other hand, when it is determined that all the sections of the travel route are finished (YES in step S86 of FIG. 14), the driving support unit 124 ends the allocating of the driving mode.

At a certain point at which the vehicle 100 travels and the current point gets close to the destination point Pb, all the sections of the travel route from the current point to the destination point Pb are included in the travel route returned from the mobility information center 400. For example, in FIG. 12, when the current point of the vehicle 100 is located in the twelfth section k12, the twelfth section k12 to the twenty-fifth section k25 are included in the travel route returned from the mobility information center 400. That is, mobility information on all the sections of the travel route from the current point to the destination point Pb is acquired.

Figure 15:
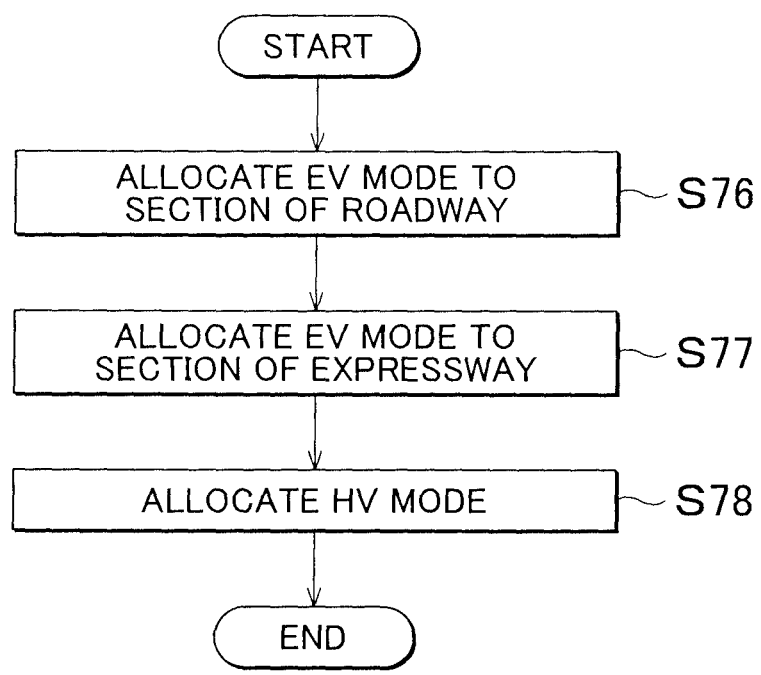
FIG. 15 is a flowchart illustrating a schematic process sequence of allocating driving modes to all sections of a travel route in the mobility information processing apparatus.

Therefore, allocation of a driving mode when mobility information on all the sections of the travel route is acquired, which is performed by the driving support unit 124, will be described below with reference to FIGS. 15 to 17. As illustrated in FIG. 15, when the allocation of a driving mode is started, the driving support unit 124 first allocates the EV mode to roadways among all the sections of the travel route (step S76 of FIG. 15). Then, the driving support unit 124 allocates the EV mode to expressways among all the sections of the travel route (step S77 of FIG. 15). Then, the driving support unit 124 allocates the HV mode to the sections to which the EV mode is not allocated (step S78 of FIG. 15). Then, the driving support unit 124 ends the allocation of the driving mode. In a hybrid vehicle, the engine can be easily started during traveling in an expressway. Accordingly, even when the EV mode is allocated, the engine often operates in the midway and the battery residual capacity may not decrease as predicted due to the operation of the engine. As a result, the driving support unit 124 allocates the EV mode in the order of the roadway and the expressway.

Figure 16:
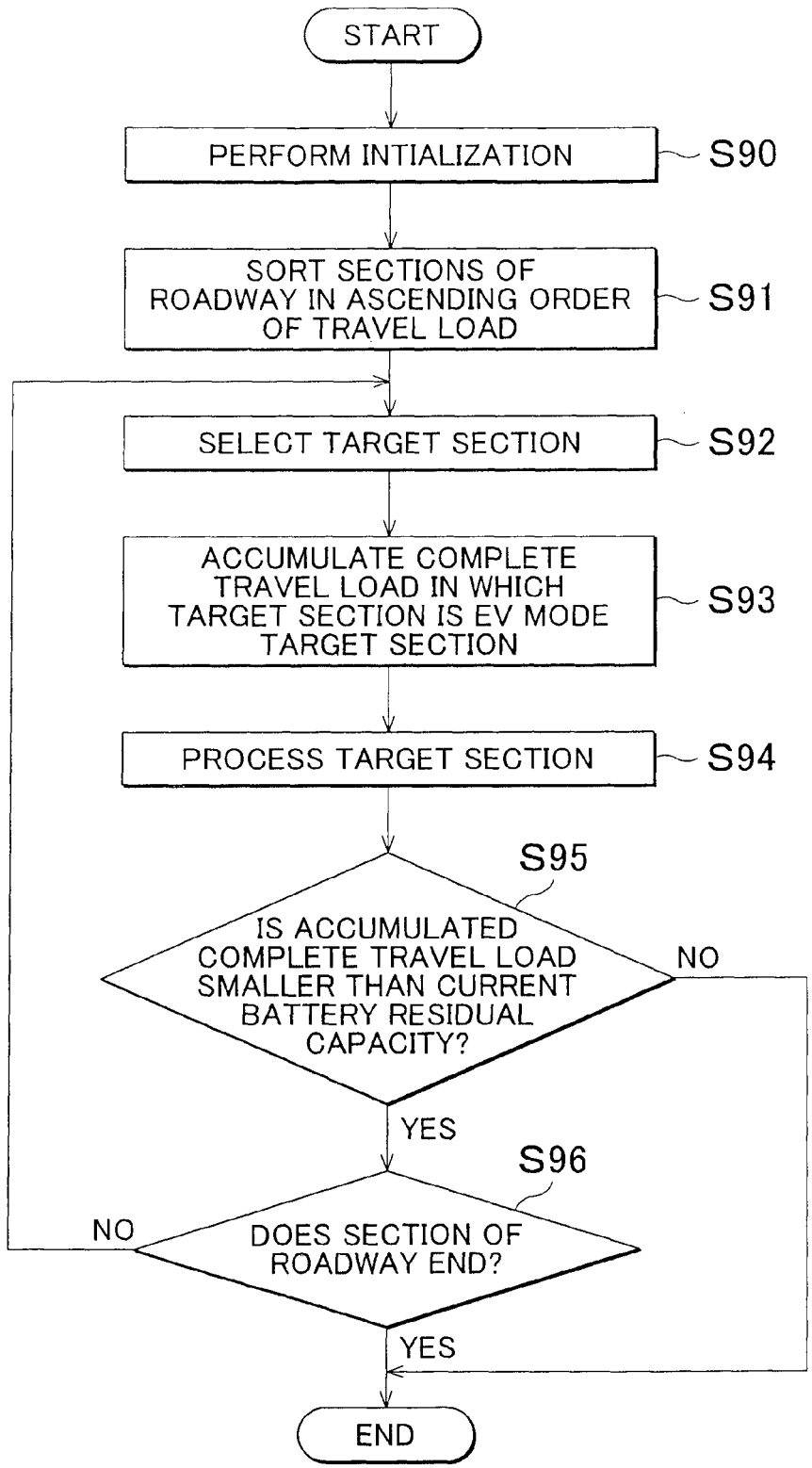
FIG. 16 is a flowchart illustrating a process sequence of allocating an EV mode to roadways among all sections of a travel route in the mobility information processing apparatus.

As illustrated in FIG. 16, when the allocation of the EV mode to the roadways (step S76 of FIG. 15) is started, the driving support unit 124 initializes the processing parameter and the like (step S90 of FIG. 16) and sorts the sections as the roadway in the ascending order of the travel load with reference to the attribute information of the sections in the travel route (step S91 of FIG. 16). Then, the driving support unit 124 selects one target section from the roadways (step S92 of FIG. 16). A section having a smallest amount of energy among the sections as the roadways to which the EV mode is not allocated is selected as the one target section. Then, the driving support unit 124 adds the selected section to the target sections of the EV mode and accumulates the complete travel load of the selected section to the complete travel load of the sections to which the EV mode has been allocated up to now (step S93 of FIG. 16). Then, the driving support unit 124 selects a next section as a target section (step S94 of FIG. 16). The driving support unit 124 determines whether the accumulated travel load is smaller than the battery residual capacity (step S95 of FIG. 16). When it is determined that the accumulated travel load is not smaller than, that is, larger than, the battery residual capacity (NO in step S95 of FIG. 16), the driving support unit 124 ends the allocation of the EV mode to the roadways.

On the other hand, when it is determined that the accumulated travel load is smaller than the battery residual capacity (YES in step S95 of FIG. 16), the driving support unit 124 determines whether the allocation of the driving mode to all the roadways among all the sections of the travel route is finished (step S96 of FIG. 16). When it is determined that the allocation of the driving, mode to all the roadways among all the sections of the travel route is not finished, that is, non-finished (NO in step S96 of FIG. 16), the driving support unit 124 performs the processes of step S92 and steps subsequent thereto on the next section of the roadways. On the other hand, when it is determined that the allocation of the driving mode to all the roadways among all the sections of the travel route is finished (YES in step S96 of FIG. 16), the driving support unit 124 ends the allocation of the EV mode to the roadways.

Figure 17:
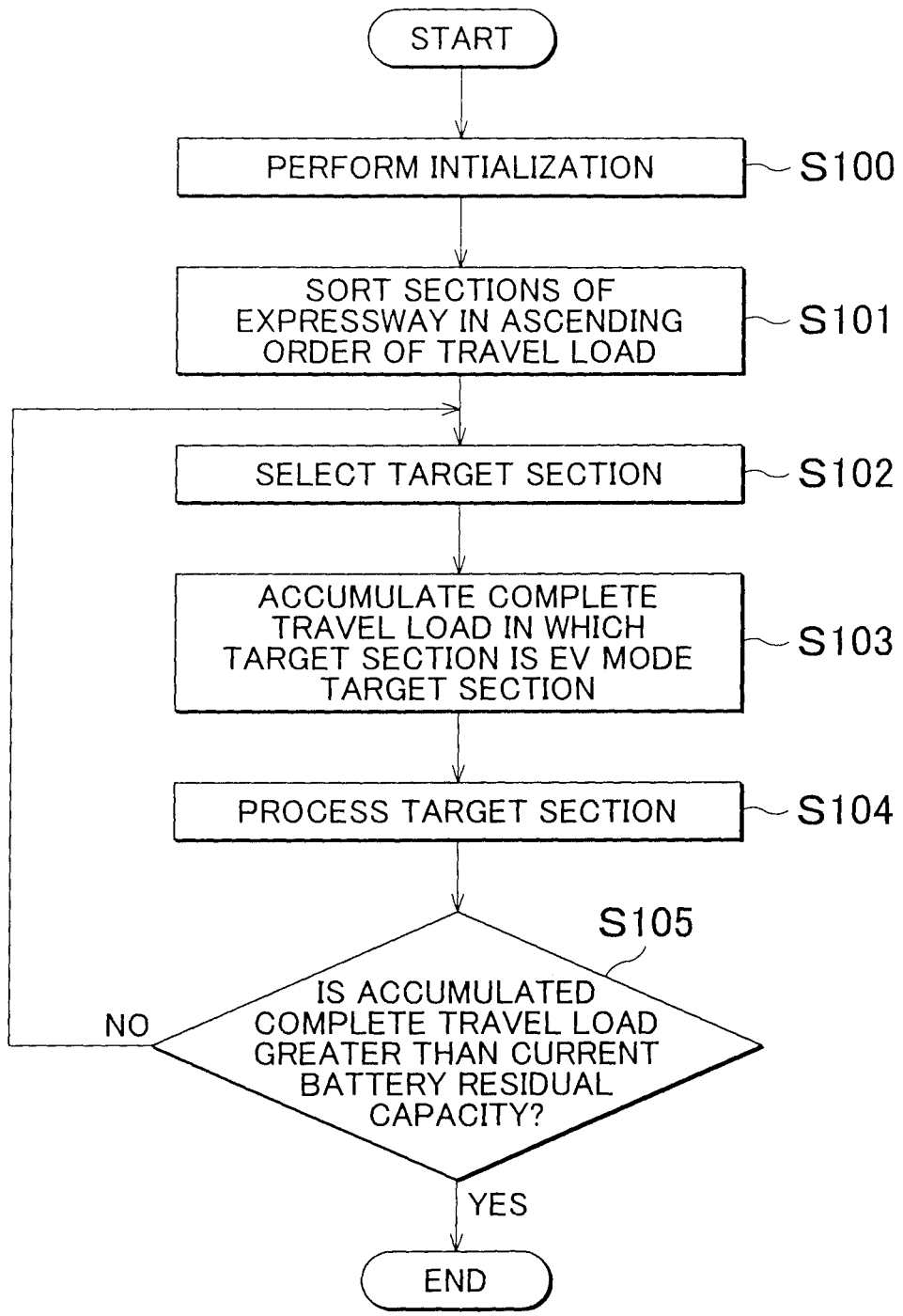
FIG. 17 is a flowchart illustrating a process sequence of allocating an EV mode to expressways among all sections of a travel route in the mobility information processing apparatus.

As illustrated in FIG. 17, when the allocation of the EV mode to the expressways (step S77 of FIG. 17) is started, the driving support unit 124 initializes the processing parameter and the like (step S100 of FIG. 17) and sorts the sections as the expressways in the ascending order of the travel load with reference to the attribute information of the sections in the travel route (step S101 of FIG. 17). Then, the driving support unit 124 selects one target section from the expressways (step S102 of FIG. 17). A section having a smallest amount of energy among the sections as the expressways to which the EV mode is not allocated, is selected as the one target section. Then, the driving support unit 124 adds the selected section to the target sections of the EV mode and accumulates the complete travel load of the selected section to the complete travel load of the sections to which the EV mode has been allocated up to now (step S103 of FIG. 17). Then, the driving support unit 124 selects, a next section as a target section (step S104 of FIG. 17). The driving support unit 124 determines whether the accumulated travel load is smaller than the battery residual capacity (step S105 of FIG. 17). When it is determined that the accumulated travel load is larger than the battery residual capacity (YES in step S105 of FIG. 17), the driving support unit 124 ends the allocation of the EV mode to the expressways.

On the other hand, when it is determined that the accumulated travel load is smaller than the battery residual capacity (NO in step S105 of FIG. 17), the driving support unit 124 performs the processes of step S102 and steps subsequent thereto on the next section of the expressways. When there is no section to which the driving mode is allocated, the driving support unit 124 ends the allocation of the EV mode to the expressways.

As described above, in the mobility information processing apparatus, the mobility information processing method, and the driving support system according to this embodiment, the following advantage can be achieved in addition to the advantages (2) to (5) and (9) described in the first embodiment.

(11) Even when the amount of energy of a section located apart from the predetermined point, that is, a section exceeding the upper limit value Nmax, cannot be estimated, the driving modes for the sections located up to the predetermined point are selected depending on the section attributes (roadway or expressway) and the driving modes can be appropriately allocated to the sections. Conversely, it is possible to prevent inappropriate driving modes from being uselessly allocated to the sections. Accordingly, a possibility that the driving mode based on the attribute of a section will be appropriately allocated to a section exceeding the upper limit value Nmax is secured.

When the processing capability of the mode allocating unit 108*a* is determined depending on the number of sections, it is possible to appropriately allocate the driving modes to all the sections of the travel route exceeding the upper limit value Nmax.

(13) Out of the EV mode and the HV mode generally included in the vehicle 100 including plural driving modes such as a hybrid vehicle, the driving modes can be appropriately selected for the sections depending on the attribute conditions (roadway or not). That is, a unsuitable driving mode is not selected for each section depending on the attribute condition thereof. Accordingly, by allocating an appropriate driving modes for the sections up to the upper limit value Nmax, appropriate driving modes are also set for the sections exceeding the upper limit value Nmax.

(14) Since the EV mode is suitable for roadways and the HV mode is suitable for expressways, the unsuitable HV mode is not allocated to the expressways. Accordingly, the EV mode suitable for roadways is selected for the roadways of the sections exceeding the upper limit value Nmax.

Fourth Embodiment

A fourth embodiment of a mobility information processing apparatus, a mobility information processing method, and a driving support system will be described with reference to FIG. 18.

This embodiment and the first embodiment are different from each other, in that the configuration of switching to a new driving mode when the new driving mode is allocated during traveling in the allocated driving mode, but are equal to each other in the other configurations. Accordingly, the configuration different from the first embodiment will be mainly described below, and the same configurations as in the first embodiment will be referenced by the same reference numerals and detailed description thereof will not be repeated for the purpose of convenience of explanation.

Figure 18:
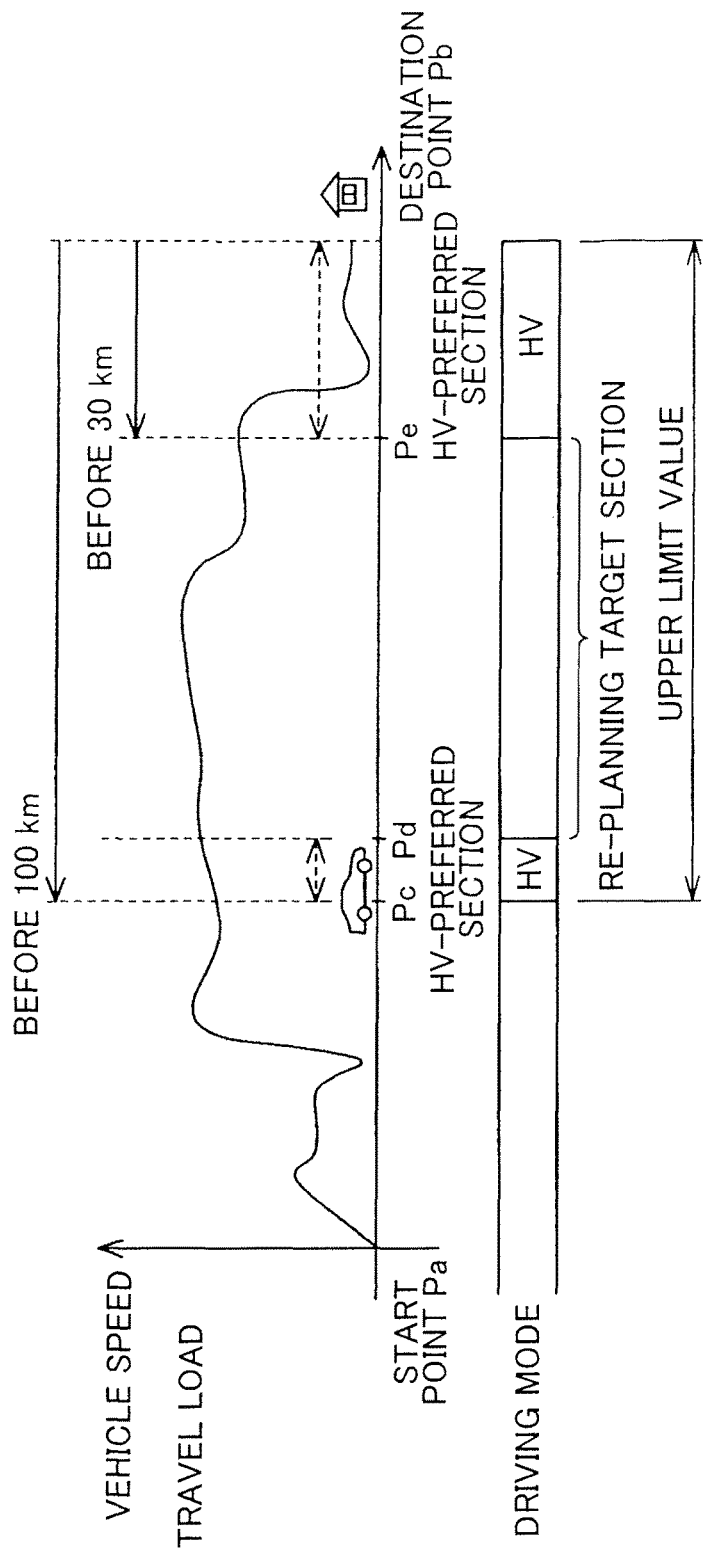
FIG. 18 is a diagram schematically illustrating a processing aspect in a fourth embodiment of a mobility information processing apparatus.

As illustrated in FIG. 18, it is assumed that the vehicle 100 starting from the start point Pa travels to the destination point Pb. It is also assumed that the total number of sections of the travel route from the start point Pa to the destination point Pb is greater than the upper limit value Nmax. It is also assumed that the total number of sections of the travel route from the current point to the destination point Pb is less than or equal to the upper limit value Nmax when the current point of the vehicle 100 reaches a point in 100 km before the destination point Pb. That is, when the current point Pc of the vehicle 100 is apart by greater than 100 km from the destination point Pb, the number of sections of the travel route is greater than the upper limit value Nmax and thus some sections of the travel route are merged. On the other hand, when the current point Pc of the vehicle 100 is apart by 100 km or less from the destination point Pb, the number of sections of the travel route is less than or equal to the upper limit value Nmax and thus the merging of the travel route or the like is not performed. For this reason, when the driving modes are allocated in a state where the sections are merged and the driving modes are allocated in a state where the driving modes are not merged, the allocation of the driving modes to the sections may be greatly changed in comparison with allocation of a driving mode which is normally performed.

At any rate, when the allocation of the driving modes to the sections is changed, particularly, the change is great, and a new driving mode is immediately reflected in the traveling of the vehicle 100, discomfort relevant to continuity to the allocation of the driving mode up to now may be given to the driver.

Therefore, in this embodiment, when the allocation of the driving mode is performed again, the possibility that the switching to a new driving mode due to the performing of the allocation of the driving mode will give a driver discomfort is reduced. Accordingly, the driving mode within predetermined sections from the current point Pc is excluded from the resetting range and the current driving mode is maintained. Specifically, the section in which the vehicle currently travels maintains the current driving mode. In sections subsequent to the current section, a section to which the allocation of the driving mode is presented to the driver through the display unit 113 (between the current point Pc and the point Pd) maintains the driving mode presented to the driver.

For example, as illustrated in FIG. 18, the HV mode is set to the section including the current point Pc located apart 100 km from the destination point Pb to the section including a point Pd on the destination point side. At this time, the current driving mode is maintained in the sections from the current point Pc to the point Pd on the destination point side. FIG. 18 illustrates an example where the HV modes are allocated to the maintained sections, but the EV mode may be allocated to all or some sections of the maintained sections. The sections from the point Pd on the destination point side to the destination point Pb are set as re-planning target sections and the driving modes are re-allocated to the re-planning target sections.

In this embodiment, in order to reduce the battery residual capacity as much as possible when the vehicle arrives at the destination point Pb, it is preferable that the driving modes be allocated so as to reduce the battery residual capacity at a point Pe before the destination point Pb. Accordingly, the range around the destination from the destination point Pb to the point Pe before the destination point Pb, for example, a point 30 km before, may be excluded from the candidate sections of the EV mode.

As illustrated in FIG. 18, the HV mode is allocated to the sections included in the range around the destination point. That is, among all the sections of the travel route, the HV mode is allocated to the sections included in the range around the destination point, and the driving mode is re-allocated with maintaining the allocation to the HV mode to the sections. Accordingly, the allocation of the driving mode is performed so as to reduce the residual amount of energy of the rechargeable battery 110 as much as possible until arriving the destination point Pb.

For this reason, as illustrated in FIG. 18, the current driving mode is maintained in the sections from the position 100 km before the destination point Pb to the point Pd on the destination point side and the sections from the point Pe 30 km before to the destination point Pb are determined to be sections to which the HV mode is allocated. The other sections are set as the re-planning target sections and the driving mode is re-allocated to the re-planning target sections. Accordingly, the driving mode is appropriately allocated to the re-planning target sections.

The sections other than the re-planning target sections may be excluded from the re-allocation of the driving mode, but the HV mode may be preferentially allocated to the sections of the HV mode other than the re-planning target section at the time of re-allocation of the driving mode. In the allocation of the driving mode, since the HV mode is allocated to the sections having a high travel load, the driving mode may be allocated, for example, after the travel load of the sections in which the HV mode is maintained is temporarily increased. The temporary increase of the travel load can be carried out by multiplication by a predetermined magnification or addition of a predetermined value.

As described above, in the mobility information processing apparatus, the mobility information processing method, and the driving support system according to this embodiment, the following advantage can be achieved. (15) By allocating the driving mode again, the change of the driving mode that gives discomfort to the driver in the section in which the vehicle travels or the section guided by the display unit 113 can be prevented.

By performing the allocation of the driving mode except for the section in which discomfort is given to the driver, the driving mode for reducing the battery residual capacity can be appropriately allocated to the section to which the driving mode is allocated.

(16) By adjusting the travel load so that the HV mode is preferentially allocated to the range around the destination point, the vehicle can arrive at the destination point Pb in a state where the battery residual capacity is reduced. When the battery residual capacity is large, the battery residual capacity may be consumed in the range around the destination. Accordingly, it is possible to perform the driving mode allocating process with reduced discomfort to the driver.

Other Embodiments

The above-mentioned embodiments may be embodied in the following forms. Two or more arbitrary embodiments of the first and second embodiments, the third embodiment, and the fourth embodiment may be combined for practice.

The above-mentioned embodiments describe that the onboard network is the CAN. However, the present invention is not limited to the embodiments, and the onboard network may be other networks such as Ethernet (registered trademark), FlexRay network (registered trademark), and IEEE1394 (FireWire (registered trademark)) as long as it can be connected to the ECU so as to communication therewith. These networks including the CAN may be combined. Accordingly, it is possible to achieve improvement in a degree of freedom in configuration of the vehicle employing the mobility information processing apparatus.

The above-mentioned embodiments describe that the hybrid controller 108 or the onboard controllers 120 and 120A include an ECU. However, the present invention is not limited to the embodiments, and other units may include an ECU if necessary. For example, at least one of the GPU unit, the onboard camera, the millimeter, wave radar, the acceleration sensor, the vehicle speed sensor, the accelerator sensor, the brake sensor, the electric actuator, the rechargeable battery, the navigation system, the display unit, the meter controller, the accelerator actuator, and the brake actuator may include an ECU. Accordingly, it is possible to achieve improvement in a degree of freedom in configuration of the mobility information processing apparatus.

The above-mentioned embodiments describe that the navigation system 112 and the driving support unit 124 are independently configured. However, the present invention is not limited to the embodiments, and the navigation system and the driving support unit may be disposed in the same device. Accordingly, it is possible to achieve improvement in a degree of freedom in configuration of the mobility information processing apparatus.

The above-mentioned embodiments describe that the hybrid controller 108 and the driving support unit 124 are independently configured. However, the present invention is not limited to the embodiments, and the hybrid controller and the driving support unit may be disposed in the same device. Accordingly, it is possible to achieve improvement in a degree of freedom in configuration of the mobility information processing apparatus.

The above-mentioned embodiments describe that the units such as the navigation system 112, the display unit 113, and the onboard controller 120 or 120A are incorporated into the vehicle 100. However, the present invention is not limited to the embodiments, and the unit such as the navigation system, the display unit, and the onboard controller may employ a portable information processing apparatus such as a mobile phone or a smart phone as partial or all functions thereof. Accordingly, it is possible to achieve enlargement in a degree of freedom in design of the mobility information processing apparatus.

The above-mentioned embodiments describe that the driving support unit 124, the navigation system 112, the map information database 111, and the like are mounted on the vehicle 100. However, the present invention is not limited to the embodiments, and partial functions of the driving support unit, the navigation system, the map information database, and the like may be disposed in an information processing apparatus other than the vehicle or may be disposed in a portable information processing apparatus. Examples of the information processing apparatus other than the vehicle include an information processing center, and examples of the portable information processing apparatus include a mobile phone or a smart phone. When the information processing apparatus other than the vehicle is used, information may be transmitted and received via wireless communication lines. The portable information processing apparatus may be connected to the onboard network, may be connected by short-range communication, or may transmit and receive information via wireless communication lines. Accordingly, it is possible to achieve enlargement in a degree of freedom in design of the mobility information processing apparatus.

The above-mentioned embodiments describe that the travel loads of the sections of the travel route are acquired or calculated from the information stored in the map information database. However, the present invention is not limited, and the travel loads of the sections of the travel route may be acquired or calculated from a training database. For example, as long as the route is a route in which the vehicle has traveled, the travel loads stored in the training database and previously required for traveling in the route can be used. Accordingly, it is possible to achieve enlargement in a degree of freedom in design of the mobility information processing apparatus.

The third embodiment describes that all the sections of the travel route searched from the mobility information center is not transmitted to the vehicle 100. However, the present invention is not limited to this embodiment, and all the sections of the travel route acquired by the navigation system or the portable information processing apparatus, or the like mounted on the vehicle may not be transmitted to the driving support unit. Accordingly, it is possible to achieve enlargement in a degree of freedom in design of the mobility information processing apparatus.

The third embodiment describes that the travel route of all the sections is searched by the mobility information center. However, the present invention is not limited to this embodiment, and when the travel route, is long, the mobility information center may search only a part of the travel route. Similarly, the navigation system or the portable information processing apparatus mounted on the vehicle may search only a part of the travel route. In this case, the driving mode can also be appropriately allocated to all the sections of the travel route. Accordingly, it is possible to achieve enlargement of an applicable range of the mobility information processing apparatus.

The first embodiment describes that the travel route of the vehicle 100 is searched. However, the present invention is not limited to this embodiment, and the travel route may be searched from the outside of the vehicle. For example, the mobility information center according to the third embodiment or other processing apparatuses may acquire the travel route by communications. Accordingly, it is possible to achieve enlargement in a degree of freedom in design of the mobility information processing apparatus.

The above-mentioned embodiments describe that there are two types of driving modes, but the present invention is not limited to the embodiments and there may be three or more types of driving modes. Accordingly, it is possible to achieve enlargement of an applicable range of the mobility information processing apparatus.

The above-mentioned embodiments describe that the driving mode includes the EV mode and the HV mode, but the present invention is not limited to the embodiments and the driving mode may not include at least one of the EV mode and the HV mode as long as it includes plural modes. In this case, a driving mode based on the travel load can also be provided as a mode included in the driving mode. Accordingly, it is possible to achieve enlargement of an applicable range of the mobility information processing apparatus.

The first embodiment describes that the estimation threshold value indicates an amount of energy. However, the present invention is not limited to the embodiment, and as long as the sections as the target sections of the EV mode can be distinguished from the sections exceeding the upper limit value, the sections as the target sections of the EV mode may be distinguished on the basis of one or more pieces of information included in the map data such as a road gradient, a legal speed limit, and a road type. Accordingly, it is possible to achieve enlargement in a degree of freedom in design of the mobility information processing apparatus.

The first embodiment describes that the EV mode is allocated to the sections in the ascending order of the travel load, that is, the amount of energy required for traveling. However, the present invention is not limited to the embodiment, and as long as the EV mode can be appropriately allocated, the EV mode may be allocated to the sections on the basis of one or more pieces of information included in the map data such as a road gradient, a legal speed limit, and a road type. The EV mode may be allocated to the sections on the basis of the engine efficiency or the efficiency of the rechargeable battery. Accordingly, it is possible to achieve enlargement in a degree of freedom in design of the mobility information processing apparatus.

The second embodiment describes that the allocation of the driving mode is performed by the driving support unit 124. However, the present invention is not limited to this embodiment, and the allocation of the driving mode may be performed by the hybrid controller or the like. Accordingly, it is possible to achieve enlargement in a degree of freedom in design of the mobility information processing apparatus.

The first embodiment describes that the allocation of the driving mode is performed by the hybrid controller 108. However, the present invention is not limited to the embodiment, and the allocation of the driving mode may be performed by the driving support unit or the like other than the hybrid controller as long as the travel loads of the sections of the travel route and the battery residual capacity of the rechargeable battery can be acquired. In this case, the sections of the travel route to which the driving modes are allocated, the driving mode corresponding to the traveling section, or the like may be transmitted to the hybrid controller. Accordingly, it is possible to achieve enlargement in a degree of freedom in design of the mobility information processing apparatus.

The above-mentioned embodiments describe that the allocation of the driving mode is mainly performed when the position of the vehicle 100 is at the start point Pa, but the allocation of the driving mode may be performed at any point while the vehicle moves to the destination point Pb. By the performance at any point, the appropriate allocation of the driving mode can be performed on all the sections of the travel route. Accordingly, it is possible to achieve enlargement in a degree of freedom in design of the mobility information processing apparatus.

The above-mentioned embodiments describe that the upper limit value Nmax in the hybrid controller 108 is determined on the basis of the processing capability such, as the length of the processing time. However, the present invention is not limited to the embodiments, and the upper limit value Nmax in the hybrid controller may be determined on the basis of the memory capacity of the hybrid controller, the time required for acquiring the travel route, or the like. Accordingly, it is possible to achieve enlargement of an applicable range of the mobility information processing apparatus.

The above-mentioned embodiments describe that the sections located distant from the predetermined point are set as the sections in which the number of sections from the vehicle 100 is greater than the upper limit value Nmax. However, the present invention is not limited to the embodiments, and as long as the processing load can be appropriately set, the sections located more distant from the predetermined point may be determined depending on the distance from the vehicle. At this time, the distance from the vehicle may be a straight distance or a route distance. Accordingly, it is possible to achieve enlargement in a degree of freedom in design of the mobility information processing apparatus.

The above-mentioned embodiments describe that the hybrid vehicle includes the electric motor and the engine as the drive source. However, the present invention is not limited to the embodiments, and as long as a moving object includes plural drive sources and has different environments in which the drive sources can be efficiently applied, that is, plural driving modes, the allocation of the driving mode in the travel route can be performed. For example, the present invention may be applied to allocation of a driving mode in a moving object equipped with two types of engines using different fuels, allocation of a driving mode in a moving object equipped with two types of electric motors having different types of batteries, and the like. Accordingly, it is possible to achieve enlargement of an applicable range of the mobility information processing apparatus.

The above-mentioned embodiments describe that the mobility information processing apparatus is mounted on the vehicle 100. However, the present invention is not limited to the embodiments, and the mobility information processing apparatus may be applied to a moving object other than a vehicle, such as a railway train, an aircraft, a ship, or a robot. Accordingly, it is possible to achieve enlargement of an applicable range of the mobility information processing apparatus.

The invention claimed is:

1. A mobility information processing apparatus comprising:
 a first electronic control unit configured to allocate one driving mode, which is selected from a plurality of driving modes having different drive forms, as the driving mode of a moving object to each partitioned section in a travel route of the moving object; and
 a second electronic control unit configured to estimate the driving mode selected for each section located after a predetermined point in the travel route and calculate an estimated amount of energy required for traveling in a section estimated to correspond to the one selected driving mode among the plurality of driving modes, the second electronic control unit configured to (i) merge all sections located after the predetermined point in the travel route and estimated to be allocated to the one selected driving mode into a merged section and (ii) calculate an amount of energy required for traveling in the merged section as the estimated amount of energy, wherein the first electronic control unit determines whether the one selected driving mode is allocated to said each section up to a predetermined point in the travel route on the basis of an allocated amount of energy obtained, and the first electronic control unit is configured to allocate the one selected driving mode to said each section up to the predetermined point in the travel route and the merged section, based on the estimated amount of energy and an amount of energy required for traveling in the section up to the predetermined point in the travel route, such that the estimated amount of energy and the amount of energy required for traveling in the section up to the predetermined point in the travel route is not greater than a residual amount of energy of a power source used in the one selected driving mode.

2. The mobility information processing apparatus according to claim 1, wherein the predetermined point in the travel route is a point determined as the upper limit value of the number of sections in the travel route to which the driving modes are able to be allocated by the first electronic control unit.

3. The mobility information processing apparatus according to claim 1, wherein the moving object is a hybrid vehicle, and the plurality of driving modes includes a mode in which the hybrid vehicle travels by the use of an electric motor using a battery as a power source as the one selected driving mode and includes a second driving mode which is a driving mode in which the hybrid vehicle travels by the use of the electric motor and an internal combustion engine together when the one selected driving mode is a first driving mode.

4. The mobility information processing apparatus according to claim 3, wherein a travel load used to calculate an energy balance required for traveling in each section of the travel route is set for each section, and the first electronic control unit allocates the first driving mode to the sections having a relatively low travel load among the sections up to the predetermined point in the travel route and allocates the second driving mode to the other sections.

5. The mobility information processing apparatus according to claim 4, wherein the first electronic control unit allocates the first driving mode to the sections in the travel route in the ascending order of the travel load.

6. The mobility information processing apparatus according to claim 4, wherein the second electronic control unit estimates sections to which the first driving mode is allocated on the basis of the travel load.

7. The mobility information processing apparatus according to claim 1, wherein the second electronic control unit merges the sections estimated to correspond to the one selected driving mode into one section and calculates the estimated amount of energy of the merged section, and the first electronic control unit calculates the allocated amount of energy by subtracting the estimated amount of energy of the merged section from the residual amount of energy of a power source used in the one selected driving mode for each section up to the predetermined point in the travel route.

8. The mobility information processing apparatus according to claim 1, wherein the second electronic control unit further estimates the amount of energy required for all the sections of the travel route, and the first electronic control unit allocates the one selected driving mode to all the sections of the travel route when the residual amount of energy of the power source used in the one selected driving mode is greater than the estimated amount of energy required for all the sections of the travel route in the sections up to the predetermined point in the travel route before determining whether the one selected driving mode is allocated to the sections up to the predetermined point in the travel route.

9. The mobility information processing apparatus according to claim 1, wherein the first electronic control unit is disposed in the moving object.

10. A mobility information processing method of allocating one driving mode, which is selected from a plurality of driving modes having different drive forms, as the driving mode of a moving object to each partitioned section in a travel route of the moving object, comprising:

estimating the driving mode selected for each section located after a predetermined point in the travel route and calculating an estimated amount of energy required for traveling in a section estimated to correspond to the one selected driving mode among the plurality of driving modes merging all sections located after the predetermined point in the travel route and estimated to be allocated to the one selected driving mode into a merged section;

calculating an amount of energy required for traveling in the merged section as the estimated amount of energy; and determining whether the one selected driving mode is allocated to said each section up to a predetermined point in the travel route on the basis of an allocated amount of energy obtained; and allocating the one selected driving mode to said each section up to the predetermined point in the travel route and the merged section, based on the estimated amount of energy and an amount of energy required for traveling in the section up to the predetermined point in the travel route, such that the estimated amount of energy and the amount of energy required for traveling in the section up to the predetermined point in the travel route is not greater than a residual amount of energy of a power source used in the one selected driving mode.

11. A driving support system that supports a driving operation of causing a moving object to travel on the basis of one driving mode, which is selected from a plurality of driving modes having different drive forms and allocated to partitioned sections in a travel route of the moving object, comprising:

a first electronic control unit configured to allocate one driving mode, which is selected from a plurality of driving modes having different drive forms, as the driving mode of a moving object to each partitioned section in a travel route of the moving object; and a second electronic control unit configured to estimate the driving mode selected for each section located after a predetermined point in the travel route and that calculates an estimated amount of energy required for traveling in a section estimated to correspond to the one selected driving mode among the plurality of driving modes, the second electronic control unit configured to (i) merge all sections located after the predetermined point in the travel route and estimated to be allocated to the one selected driving mode into a merged section and (ii) calculate an amount of energy required for traveling in the merged section as the estimated amount of energy, wherein the first electronic control unit determines whether the one selected driving mode is allocated to said each section up to a predetermined point in the travel route on the basis of an allocated amount of energy obtained, the first electronic control unit is configured to allocate the one selected driving mode to said each section up to the predetermined point in the travel route and the merged section, based on the estimated amount of energy and an amount of energy required for traveling in the section up to the predetermined point in the travel route, such that the estimated amount of energy and the amount of energy required for traveling in the section up to the predetermined point in the travel route is not greater than a residual amount of energy of a power source used in the one selected driving mode, and said one driving mode selected from the plurality of driving modes is allocated to each section in the travel route.

* * * * *